(12) United States Patent
Yoo

(10) Patent No.: US 12,517,323 B2
(45) Date of Patent: Jan. 6, 2026

(54) OPTICAL IMAGING SYSTEM

(71) Applicant: Samsung Electro-Mechanics Co., Ltd., Suwon-si (KR)

(72) Inventor: Ho Sik Yoo, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 678 days.

(21) Appl. No.: 16/999,185

(22) Filed: Aug. 21, 2020

(65) Prior Publication Data

US 2021/0247592 A1 Aug. 12, 2021

(30) Foreign Application Priority Data

Feb. 10, 2020 (KR) .......................... 10-2020-0015631
Apr. 28, 2020 (KR) .......................... 10-2020-0051417

(51) Int. Cl.
*G02B 9/62* (2006.01)
*G02B 13/00* (2006.01)
*G02B 13/18* (2006.01)

(52) U.S. Cl.
CPC ........... *G02B 9/62* (2013.01); *G02B 13/0045* (2013.01); *G02B 13/18* (2013.01)

(58) Field of Classification Search
CPC . G02B 9/62; G02B 9/64; G02B 13/18; G02B 13/0045; G02B 27/0018; G02B 7/021; G02B 9/60; G02B 13/00; G02B 13/04; G02B 13/06; G02B 7/02; G02B 7/04; G02B 3/04; G02B 27/00; G02B 27/0025; G02B 5/00; G02B 5/20; G02B 5/208; G03B 17/12; H04N 23/55

USPC ....... 359/713, 756, 752, 757, 758, 728, 739, 359/682, 658
See application file for complete search history.

(56) References Cited

U.S. PATENT DOCUMENTS

| 5,422,697 A * | 6/1995 | Ichinomiya ........ G02B 27/0018 396/510 |
| 6,853,507 B2 * | 2/2005 | Ryu ....................... G02B 7/022 359/823 |
| 9,279,961 B2 * | 3/2016 | Chen .................. G02B 13/0045 |
| 9,354,444 B2 | 5/2016 | Lin |
| 9,374,513 B2 * | 6/2016 | Chen ........................ G02B 9/62 |

(Continued)

FOREIGN PATENT DOCUMENTS

| CN | 103472573 A | 12/2013 |
| CN | 103777311 A | 5/2014 |

(Continued)

OTHER PUBLICATIONS

Stops and Apertures, 2019, pp. 1-5 [online], [retrieved Apr. 4, 2023], retrieved from the Internet <URL: https://web.archive.org/web/20190116052618/http://electron9.phys.utk.edu/optics421/modules/m3/Stops.htm>. (Year: 2019).*

(Continued)

*Primary Examiner* — Jie Lei
(74) *Attorney, Agent, or Firm* — NSIP Law

(57) ABSTRACT

An optical imaging system includes a first lens, a second, a third lens, a fourth lens, a fifth lens, a sixth lens, the first lens to the sixth lens being disposed in order from an object side, and a gap maintaining member disposed between one or more pairs of adjacent lenses and including a projection protruding from an internal circumferential surface in a direction intersecting an optical axis.

20 Claims, 21 Drawing Sheets

(56) References Cited

U.S. PATENT DOCUMENTS

| | | | |
|---|---|---|---|
| 9,395,519 B2* | 7/2016 | Hsueh | G02B 9/62 |
| 9,435,983 B2 | 9/2016 | Liao et al. | |
| 9,759,892 B2* | 9/2017 | Hsu | G02B 13/06 |
| 9,835,825 B2* | 12/2017 | Kubota | G02B 13/0045 |
| 10,031,318 B2* | 7/2018 | Chen | G02B 13/0045 |
| 10,228,497 B2* | 3/2019 | Chou | G02B 5/005 |
| 10,345,556 B2 | 7/2019 | Son | |
| 11,054,612 B2* | 7/2021 | Zhang | G02B 13/0045 |
| 11,156,803 B2* | 10/2021 | Hsueh | G02B 13/0045 |
| 11,971,522 B2* | 4/2024 | Gao | G02B 13/0045 |
| 2013/0235473 A1 | 9/2013 | Chen et al. | |
| 2013/0329306 A1* | 12/2013 | Tsai | G02B 13/18 |
| | | | 359/713 |
| 2014/0118817 A1 | 5/2014 | Jung et al. | |
| 2015/0062721 A1 | 3/2015 | Kim et al. | |
| 2015/0153546 A1 | 6/2015 | Tang et al. | |
| 2015/0253569 A1 | 9/2015 | Lin | |
| 2015/0338607 A1 | 11/2015 | Liao et al. | |
| 2015/0370042 A1* | 12/2015 | Chen | G02B 13/0045 |
| | | | 359/713 |
| 2016/0041369 A1 | 2/2016 | Tang et al. | |
| 2016/0077311 A1 | 3/2016 | Tang et al. | |
| 2016/0139366 A1* | 5/2016 | Jung | G02B 13/0045 |
| | | | 359/713 |
| 2016/0161829 A1* | 6/2016 | Yokoyama | G03B 9/06 |
| | | | 396/510 |
| 2016/0170204 A1* | 6/2016 | Liang | G02B 7/021 |
| | | | 359/738 |
| 2016/0341929 A1 | 11/2016 | Liu et al. | |
| 2017/0336604 A1* | 11/2017 | Hsu | G02B 13/0045 |
| 2018/0045914 A1* | 2/2018 | Park | G02B 13/0045 |
| 2018/0180851 A1 | 6/2018 | Son | |
| 2018/0246260 A1 | 8/2018 | Chou et al. | |
| 2019/0004274 A1 | 1/2019 | Nakajima et al. | |
| 2019/0302393 A1 | 10/2019 | Shirotori | |
| 2019/0391367 A1* | 12/2019 | Kuo | G02B 9/62 |
| 2020/0033561 A1* | 1/2020 | Hashimoto | G02B 13/18 |
| 2020/0064600 A1 | 2/2020 | Igarashi | |
| 2020/0150406 A1* | 5/2020 | Chen | G02B 9/60 |
| 2020/0333565 A1* | 10/2020 | Chen | G02B 5/208 |
| 2021/0018725 A1* | 1/2021 | Hsu | G02B 13/0065 |
| 2021/0165189 A1* | 6/2021 | Wang | G02B 9/62 |
| 2022/0317416 A1* | 10/2022 | Zhang | G02B 9/34 |

FOREIGN PATENT DOCUMENTS

| | | | | |
|---|---|---|---|---|
| CN | 203786314 U | | 8/2014 | |
| CN | 104423015 A | | 3/2015 | |
| CN | 104678537 A | | 6/2015 | |
| CN | 105093491 A | | 11/2015 | |
| CN | 105242374 A | * | 1/2016 | |
| CN | 105372794 A | | 3/2016 | |
| CN | 105425361 A | | 3/2016 | |
| CN | 105988197 A | | 10/2016 | |
| CN | 106168700 A | | 11/2016 | |
| CN | 107219613 A | | 9/2017 | |
| CN | 207164342 U | | 3/2018 | |
| CN | 108254855 A | | 7/2018 | |
| CN | 108508679 A | | 9/2018 | |
| CN | 109212707 A | | 1/2019 | |
| CN | 209674087 U | | 11/2019 | |
| KR | 10-2014-0023551 A | | 2/2014 | |
| KR | 10-2014-0052907 A | | 5/2014 | |
| KR | 10-2017-0130863 A | | 11/2017 | |
| KR | 10-2018-0126159 A | | 11/2018 | |
| KR | 10-1955316 B1 | | 3/2019 | |
| KR | 10-2019-0096313 A | | 8/2019 | |
| KR | 10-2019-0107826 A | | 9/2019 | |
| WO | WO 2014/132795 A1 | | 9/2014 | |
| WO | WO-2015062351 A1 | * | 5/2015 | G02B 13/0045 |
| WO | WO-2017150492 A1 | * | 9/2017 | |
| WO | WO 2017/200306 A1 | | 11/2017 | |
| WO | WO-2018153012 A1 | * | 8/2018 | G02B 13/0045 |
| WO | WO 2018/220937 A1 | | 12/2018 | |

OTHER PUBLICATIONS

Focal Lengths, Apertures and F/Numbers, 2016, pp. 1-2 [online], [retrieved May 3, 2023], retrieved from the Internet <URL: https://spacemath.gsfc.nasa.gov/weekly/10Page30.pdf >. (Year: 2016).*

5 Considerations for Mechanical Design, Assembly and Alignment of Optical Systems, 2016, pp. 1-7 [online], [retrieved Oct. 30, 2023], retrieved from Internet <URL: https://www.laserfocusworld.com/sponsored/edmund-optics/article/16571942/5-considerations-for-the-mechanical-design-assembly-and-align . . . >. (Year: 2016).*

Topic 6: Optical Systems, 2007, pp. 1-20 [online], [retrieved Aug. 28, 2024], retrieved from the Internet <URL: https://www2.ph.ed.ac.uk/~wjh/teaching/mo/slides/systems/systems.pdf>. (Year: 2007).*

Lens Materials, 2010, pp. 1-7 [online], [retrieved May 25, 2023], retrieved from the Internet <URL: https://www.laramyk.com/resources/education/lens-options-and-materials/lens-materials>. (Year: 2010).*

Andy Rowlands, Physics of Digital Photography, Chapter 1, 2017, pp. 1-1 to 1-62 [online], [retrieved Nov. 2, 2023], retrieved from the Internet <URL: https://iopscience.iop.org/book/mono/978-0-7503-1242-4/chapter/bk978-0-7503-1242-4ch1.pdf>. (Year: 2017).*

Chinese Office Action issued on Aug. 19, 2022, in counterpart Chinese Patent Application No. 202011222082.6 (10 Pages in English, 12 Pages in Chinese).

Korean Office Action issued on Aug. 24, 2022, in counterpart Korean Patent Application No. 10-2020-0051417 (6 pages in English, 4 pages in Korean).

Korean Office Action issued on Feb. 9, 2022, in counterpart Korean Patent Application No. 10-2020-0051417 (9 pages in English and 6 pages in Korean).

Chinese Office Action Issued on Dec. 13, 2022, in counterpart Chinese Patent Application No. 202210424818.0 (10 Pages in Chinese, 8 Pages in English).

Taiwanese Office Action issued on Oct. 1, 2021, in counterpart Taiwanese Patent Application No. 109129016 (4 pages in English and 4 pages in Mandarin).

Chinese Office Action issued on May 31, 2023, in counterpart Chinese Patent Application No. 202210424818.0 (4 pages in English, 5 pages in Chinese).

Korean Office Action issued on May 22, 2024, in counterpart Korean Patent Application No. 10-2023-0020261 (10 pages in English, 7 pages in Korean).

* cited by examiner

OPTICAL IMAGING SYSTEM

CROSS-REFERENCE TO RELATED APPLICATION(S)

This application claims the benefit under 35 USC 119 (a) of Korean Patent Application Nos. 10-2020-0015631 filed on Feb. 10, 2020 and 10-2020-0051417 filed on Apr. 28, 2020 in the Korean Intellectual Property Office, the entire disclosures of which are incorporated herein by reference for all purposes.

BACKGROUND

1. Field

This application relates to an optical imaging system configured to prevent curvature of an imaging plane from occurring significantly even when a nearby object is imaged.

2. Description of Related Art

A mobile terminal device includes a small-sized camera module. For example, a mobile phone may include a front camera module for imaging a front object and a rear camera module for imaging a rear object. In the above-described camera module, a spatial limitation causes difficulty in adjusting an optical magnification. Therefore, a camera module includes an optical imaging system, configured to capture a long or medium-range object, and is configured to capture a short-range object. However, since the optical imaging system of the above-described camera module has a structure designed based on imaging of a long-range object, curvature of an imaging plane may occur significantly when a short-range object (in particular, an ultra-short-range object) is imaged.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

An optical imaging system configured to prevent curvature of an imaging plane from significantly occurring even when a nearby object is imaged.

In one general aspect, an optical imaging system includes a first lens, a second, a third lens, a fourth lens, a fifth lens, a sixth lens, the first lens to the sixth lens being disposed in order from an object side, and a gap maintaining member disposed between one or more pairs of adjacent lenses and including a projection protruding from an internal circumferential surface in a direction intersecting an optical axis.

The projection may have a wave shape or a sawtooth shape.

The projection may include a plurality of projections numbering 50 or more to less than 200.

A distance from the optical axis to the projection may be smaller than an effective radius of a lens disposed on an object side of the gap maintaining member.

A sign of refractive power of a lens, disposed on an object side of the gap maintaining member, may be different from a sign of refractive power of a lens disposed on an image side of the gap maintaining member.

A shape of an image-side surface of a lens, disposed on an object side of the gap maintaining member, may be different from a shape of an object-side surface of a lens disposed on image side of the gap maintaining member.

The optical imaging system may satisfy $0.1 < CT3/TTL$, where CT3 is a thickness in a center of an optical axis of the third lens, and TTL is a distance from an object-side surface of the first lens to an imaging plane.

The optical imaging system may satisfy $f3/f < 2.0$, where f is a focal length of the optical imaging system, and f3 is a focal length of the third lens.

The optical imaging system may satisfy $0.005 \text{ mm} < LSPi - R2 < 0.100 \text{ mm}$, where LSPi is an effective radius of an image-side surface of a lens disposed on an object side of the gap maintaining member, and R2 is a distance from the optical axis to an apex of the projection.

The optical imaging system may satisfy $1.003 < LSPi/R2 < 1.128$, where LSPi is an effective radius of an image-side surface of a lens disposed on an object side of the gap maintaining member, and R2 is a distance from the optical axis to an apex of the projection.

In another general aspect, an optical imaging system includes a first lens having positive refractive power, a second lens having negative refractive power, a third lens having positive refractive power, a fourth lens having negative refractive power, a fifth lens having positive refractive power, a sixth lens having negative refractive power, and a gap maintaining member disposed between one or more pairs of adjacent lenses, among the first lens to the fourth lens, and comprising a projection protruding along an elliptical internal circumferential surface in a direction intersecting an optical axis.

A distance from a center of the optical axis to the projection of the internal circumferential surface in a major-axis direction may be smaller than an effective radius of an image-side surface of a lens disposed on an object side of the gap maintaining member.

A major-axis direction of the internal circumferential surface may be parallel to a length direction of a major axis of the imaging plane.

The optical imaging system may satisfy $0.005 \text{ mm} < LSPi - Rmax < 0.100 \text{ mm}$, where LSPi is an effective radius of an image-side surface of a lens disposed on an object side of the gap maintaining member, and Rmax is a distance from the optical axis to an apex of the projection disposed at a maximum distance in a direction intersecting the optical axis.

The optical imaging system may satisfy $1.003 < LSPi/Rmax < 1.128$, where LSPi is an effective radius of an image-side surface of a lens disposed on an object side of the gap maintaining member, and Rmax is a distance from the optical axis to an apex of the projection disposed at a maximum distance in a direction intersecting the optical axis.

The gap maintaining member may be disposed between the first lens and the second lens.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
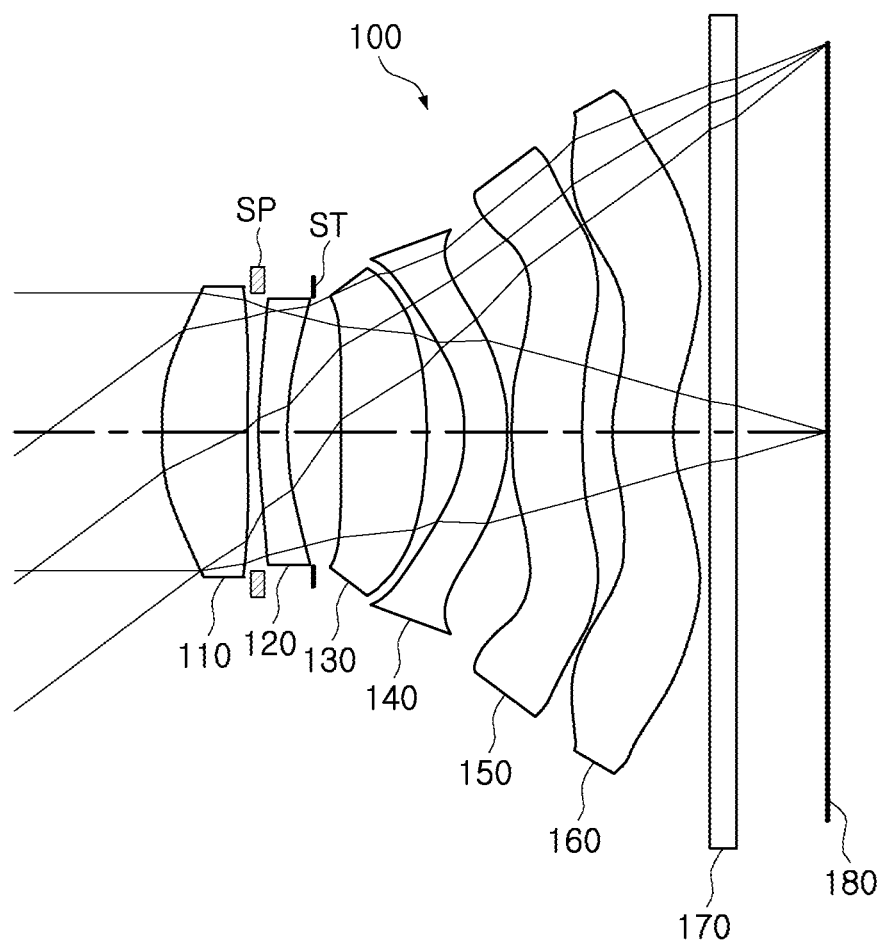
FIG. 1 illustrates a configuration of an optical imaging system according to a first example.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

The drawings may not be to scale, and the relative sizes, proportions, and depiction of elements in the drawings may be exaggerated for clarity, illustration, and convenience.

In the examples, a first lens refers to a lens most adjacent to an object (or a subject), and a sixth lens refers to a lens most adjacent to an imaging plane (or an image sensor). In the examples, units of a radius of curvature, a thickness, a TTL, an ImgH (a height of the imaging plane, which is one half of a diagonal length of the imaging plane), and a focal length are indicated in millimeters (mm). A thickness of a lens, a gap between lenses, and a TTL refer to a distance along an optical axis. Also, in the descriptions of a shape of a lens, a statement that a surface of a lens is convex indicates that an optical axis region of the surface of the lens is convex, and a statement that a surface of a lens is concave indicates that an optical axis region of the surface of the lens is concave. Thus, even when it is stated that a surface of a lens is convex, an edge region of the surface of the lens may be concave. Similarly, even when it is stated that a surface of a lens is concave, an edge region of the surface of the lens may be convex.

An optical imaging system includes six lenses disposed in order from an object side in a direction of an imaging plane. For example, the optical imaging system may include a first lens, a second lens, a third lens, a fourth lens, a fifth lens, and a sixth lens disposed in order. The first to sixth lenses are disposed with certain gaps. For example, a certain gap may be formed between an image-side surface of a front lens and an object-side surface of a rear lens.

The first lens may have refractive power. For example, the first lens may have positive refractive power. One surface of the first lens may be convex. For example, an object-side surface of the first lens may be convex. The first lens may have an aspherical surface. For example, both surfaces of the first lens may be aspherical surfaces. The first lens may be formed of a material having high light transmittance and excellent workability. For example, the first lens may be formed of plastic. However, a material of the first lens is not limited to plastic. For example, the first lens may be formed of glass.

The first lens may have a certain refractive index. For example, the refractive index of the first lens may be less than 1.6. The first lens may have a certain Abbe number. For example, the Abbe number of the first lens may be 50 or more.

The second lens may have refractive power. For example, the second lens may have negative refractive power. One surface of the second lens may be convex. For example, an object-side surface of the second lens may be convex. The second lens may have an aspherical surface. For example, both surfaces of the second lens may be aspherical surfaces. The second lens may be formed of a material having high light transmissivity and improved processability. For example, the second lens may be formed of plastic. However, the material of the second lens is not limited to plastic. For example, the second lens may be formed of glass.

The second lens may have a higher refractive index than the first lens. For example, the refractive index of the second lens may be 1.6 or more. The second lens may have a certain Abbe number. For example, the Abbe number of the second lens may be less than 23.

The third lens may have refractive power. For example, the third lens may have positive refractive power. One surface of the third lens may be convex. For example, an image-side surface of the third lens may be convex. The third lens may have an aspherical surface. For example, both surfaces of the third lens may be aspherical surfaces. The third lens may have a shape having an inflection point. For example, one or more inflection points may be formed on an object-side surface or an image-side surface of the third lens. The third lens may be formed of a material having high light transmissivity and improved processability. For example, the third lens may be formed of plastic. However, the material of the third lens is not limited to plastic. For example, the third lens may be formed of glass.

The third lens may have a lower refractive index than the second lens. The refractive index of the third lens may be less than 1.6. The third lens may have a larger Abbe number than the second lens. The Abbe number of the third lens may be 50 or more.

The fourth lens may have refractive power. The fourth lens may have negative refractive power. One surface of the fourth lens may be concave. For example, an object-side surface of the fourth lens may be concave. The fourth lens may have an aspherical surface. For example, both surfaces of the fourth lens may be aspherical surfaces. The fourth lens may be formed of a material having high light transmissivity and improved processability. For example, the fourth lens may be formed of plastic. However, the material of the fourth lens is not limited to plastic. For example, the fourth lens may be formed of glass.

The fourth lens may have a higher refractive index than the third lens. For example, the refractive index of the fourth lens may be 1.6 or more. The fourth lens may have an Abbe number larger than the second lens and smaller than the third lens. For example, the Abbe number of the fourth lens may be 20 or more to less than 30.

The fifth lens may have refractive power. For example, the fifth lens may have positive refractive power. One surface of the fifth lens may be convex. For example, an object-side surface of the fifth lens may be convex. The fifth lens may have an aspherical surface. For example, both surfaces of the fifth lens may be aspherical surfaces. The fifth lens may have a shape having an inflection point. For example, one or more inflection points may be formed on an object-side surface or an image-side surface of the fifth lens. The fifth lens may be formed of a material having high light transmissivity and improved processability. For example, the fifth lens may be formed of plastic. However, the material of the fifth lens is not limited to plastic. For example, the fifth lens may be formed of glass.

The fifth lens may have a lower refractive index than the fourth lens. For example, the refractive index of the fifth lens may be less than 1.6. The fifth lens may have a larger Abbe number than the fourth lens. For example, the Abbe number of the fifth lens may be 50 or more.

The sixth lens may have refractive power. For example, the sixth lens may have negative refractive power. One surface of the sixth lens may be convex. For example, an object-side surface of the sixth lens may be convex. The sixth lens may have a shape having an inflection point. For example, one or more inflection points are formed on both surfaces of the sixth lens. The sixth lens may have an aspherical surface. For example, both surfaces of the sixth lens may be aspherical surfaces.

The sixth lens may be formed of a material having high light transmissivity and improved processability. For example, the sixth lens may be formed of plastic. However, the material of the sixth lens is not limited to plastic. For example, the sixth lens may be formed of glass.

The sixth lens may have a lower refractive index than the fourth lens. For example, the refractive index of the sixth lens may be less than 1.6. The sixth lens may have a larger Abbe number than the fourth lens. For example, the Abbe number of the sixth lens may be 50 or more.

As described above, each of the first to sixth lenses has an aspherical shape. For example, at least one surface of the first to sixth lenses may have an aspherical shape. An aspherical surface of each lens may be represented by Equation 1, as below.

$$Z = \frac{cr^2}{1 + \sqrt{1 - (1+k)c^2 r^2}} + Ar^4 + Br^6 + Cr^8 + Dr^{10} + Er^{12} + Fr^{14} + Gr^{16} + Hr^{18} + Jr^{20} \quad \text{Equation 1}$$

In Equation 1, "c" is an inverse of a radius of a curvature of a respective lens, "k" is a conic constant, "r" is a distance from a certain point on an aspherical surface of the lens to an optical axis, "A to J" are aspheric constants, "Z" (or SAG) is a height from a certain point on an aspherical surface of the lens to an apex of the aspherical surface in an optical axis direction.

The optical imaging system may further include a stop. The stop is disposed between the second lens and the third lens. The optical imaging system may further include a filter. The filter blocks certain wavelengths of light incident through the first to sixth lenses. For example, the filter may block infrared wavelengths of the incident light. The optical imaging system further includes an image sensor. The image sensor provides an imaging plane on which light refracted by the lenses may be imaged. For example, a surface of the image sensor may form an upper surface. The image sensor may be configured to implement high resolution.

The optical imaging system includes a gap maintaining member. A plurality of projections may be formed on an internal circumferential surface of the gap maintaining member. The projection may protrude in a direction intersecting an optical axis. The projections may have a shape such as a sawtooth or a waveform. However, the shape of the projection is not limited to the sawtooth or the waveform. The projection may include a plurality of projections. For example, 50 or more to less than 200 projections may be formed on the internal circumferential surface of the gap maintaining member. The gap maintaining member may be disposed between lenses. For example, the gap maintaining member may be disposed between an image-side surface of the first lens and an object-side surface of the second lens, between an image-side surface of the second lens and an object-side surface of the third lens, and between an image-side surface of the third lens and an object-side surface of the fourth lens. Alternatively, the gap maintaining member may be disposed between lenses having refractive powers of different signs. For example, the gap maintaining member may be disposed between a lens having positive refractive power and a lens having negative refractive power. Alternatively, the gap maintaining member may be disposed between lenses having opposing surfaces of different shapes. For example, the gap maintaining member may be disposed between a lens having a convex image-side surface and a lens having a concave object-side surface, or between a lens having a concave image-side surface and a lens having a convex object-side surface. A distance from a center of the gap maintaining member to the projection may be smaller than an effective radius of an adjacent lens. For example, a distance from an optical axis to the projection of the gap-holding member may be smaller than an effective radius of a lens disposed on an object side of the gap maintaining member.

The optical imaging system may satisfy one or more of the following conditional expressions.

$$0.1 < CT3/TTL$$

$$f3/f < 2.0$$

$$f/ImgH < 1.4$$

$$1.0 < TTL/f$$

$$f\ number < 2.0$$

$$0.005\ mm < LSPi - R2 < 0.100\ mm$$

$$1.003 < LSPi/R2 < 1.128$$

$$0.005\ mm < LSPi - Rmax < 0.100\ mm$$

$$1.003 < LSPi/Rmax < 1.128$$

In the above conditional expressions, "CT3" is a thickness in a center of an optical axis of the third lens, "TTL" is a distance from an object-side surface of the first lens to an imaging plane, "f" is a focal length of the optical imaging system, "f3" is a focal length of the third lens, "ImgH" is half of a diagonal length of the imaging plane, "LSPi" is an effective radius of an image-side surface of a lens disposed on an object-side surface of the gap maintaining member, "R2" is a distance from the optical axis to an apex of the projection of the gap maintaining member, and "Rmax" is a distance from the optical axis to an apex of a projection disposed at a maximum distance in a direction intersecting the optical axis.

Each of the optical imaging system and the first to sixth lenses may have a certain focal length. For example, the focal length f of the optical imaging system may be within a range of 3.8 to 4.2 mm, the focal length f1 of the first lens may be within a range of 3.9 to 4.5 mm, the focal length f2 of the second lens may be within a range of −14.0 to −8.0 mm, the focal length f3 of the third lens may be within a range of 5.0 to 8.2 mm, a focal length f4 of the fourth lens may be within a range of −11.4 to −4.8 mm, a focal length f5 of the fifth lens may be within a range of 6.5 to 27 mm, and a focal length f6 of the sixth lens may be within a range of −110 to −12 mm.

Next, optical imaging systems according to various examples will be described.

Hereinafter, an optical imaging system according to a first example will be described with reference to FIG. 1.

The optical imaging system 100 may include a plurality of lenses, each having refractive power. For example, the optical imaging system 100 includes a first lens 110, a second lens 120, a third lens 130, a fourth lens 140, a fifth lens 150, and a sixth lens 160.

The first lens 110 has positive refractive power. In the first lens, an object-side surface is convex and an image-side surface is concave. The second lens 120 has negative refractive power, and the object side is convex and the image side is concave. The third lens 130 has positive refractive power. In the third lens, an object-side surface is convex and an image-side surface is convex. The third lens 130 has a shape having an inflection point. For example, an inflection point may be formed on the object-side surface of the third lens 130. The fourth lens 140 has negative refractive power. In the fourth lens 140, an object-side surface is concave and an image-side surface is convex. The fifth lens 150 has positive refractive power. In the fifth lens 150, an object-side surface is convex and an image-side surface is concave. The fifth lens 150 has a shape having an inflection point. For example, an inflection point may be formed on each of the object-side surface and an image side of the fifth lens 150. Both concave and convex shapes may be formed on one surface of the fifth lens 150. For example, the object-side surface of the fifth lens 150 is convex in a paraxial region and concave around the paraxial region, and the image-side surface of the fifth lens 150 is concave in the paraxial region and convex around the paraxial region. The sixth lens 160 has negative refractive power. In the sixth lens 160, an object-side surface is convex and an image-side surface is concave. The sixth lens 160 has a shape having an inflection point. For example, an inflection point may be formed on each of the object-side surface and the image-side surface of the sixth lens 160. Both concave and convex shapes may be formed on one surface of the sixth lens 160. For example, the object-side surface of the sixth lens 160 is convex in a paraxial region and concave around the paraxial region, and the image-side of the sixth lens 160 is concave in the paraxial region and convex around the paraxial region.

Among the first lens 110 to the sixth lens 160, the second lens 120 may have the highest refractive index. For example, the second lens 120 may have a refractive index of 1.65 or more, but each of the other lenses may have a refractive index less than 1.65. Among the first lenses 110 to sixth lenses 160, the second lens 120 may have the smallest Abbe number. For example, the second lens 120 may have an Abbe number less than 21, but each of the other lenses may have an Abbe number of 21 or more.

The optical imaging system 100 includes a stop ST. For example, the stop ST is disposed between the second lens 120 and the third lens 130. The stop ST may control the amount of light incident on an imaging plane 180. The optical imaging system 100 includes one or more gap maintaining members SP. The gap maintaining member SP may maintain a constant distance between two of the lenses. In addition, the gap maintaining member SP may reduce scattered light generated between the two lenses. In this example, the gap maintaining member SP is disposed between the first lens 110 and the second lens 120. A projection, protruding in a direction intersecting the optical axis, is formed on the internal circumferential surface of the gap maintaining member SP. The gap maintaining member SP may have one of the shapes illustrated in FIGS. 17 to 20. The optical imaging system 100 includes a filter 170. For example, the filter 170 is disposed between the sixth lens 160 and the imaging plane 180. The filter 170 may block light having a specific wavelength from being incident. For example, the filter 170 may block infrared rays from being incident on the imaging plane 180. The optical imaging system 100 includes an image sensor. The image sensor provides an imaging plane 180 on which light refracted through the lenses is imaged. The image sensor converts an optical signal, focused on the imaging plane 180, into an electrical signal.

Figure 2:
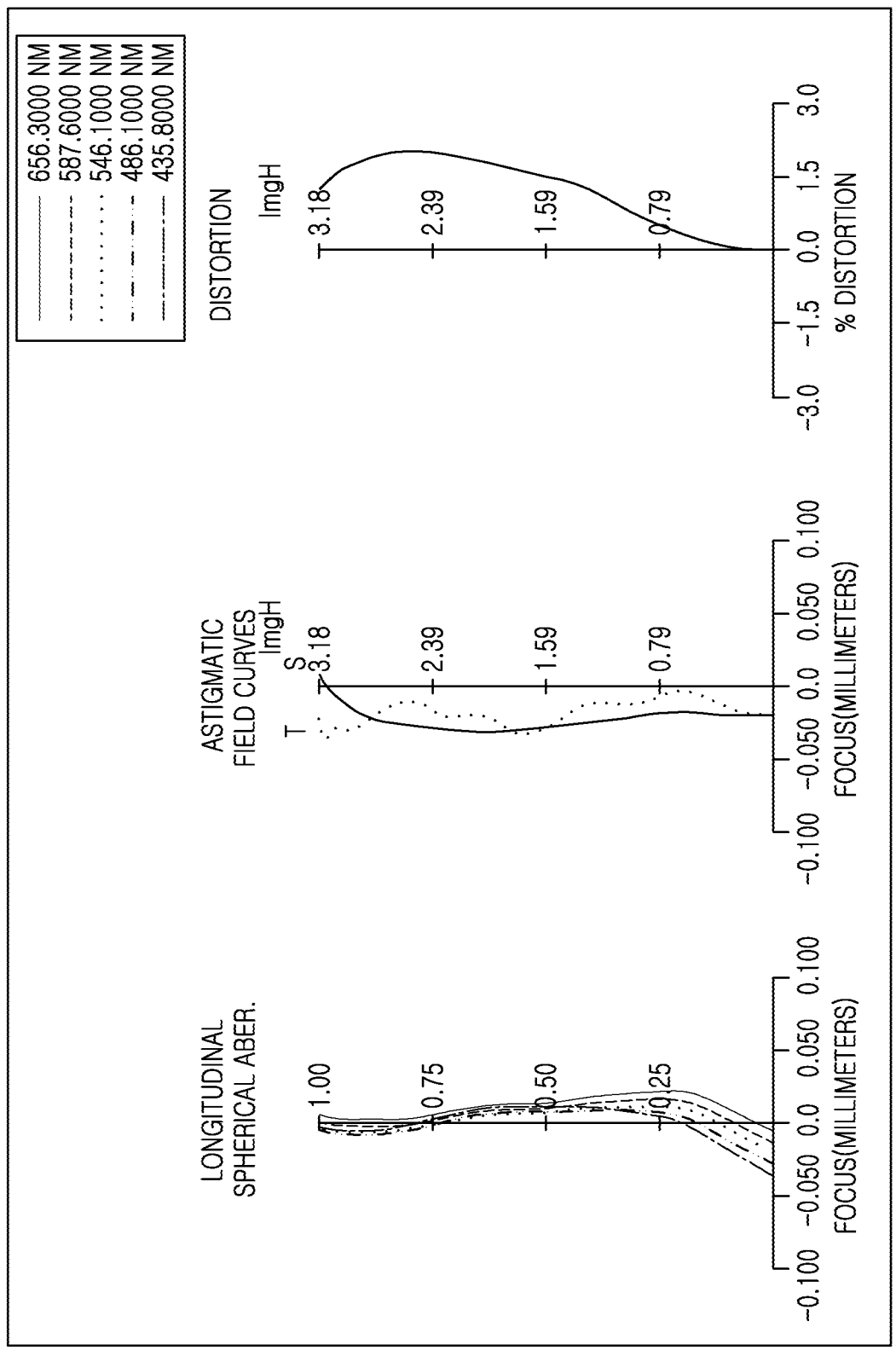
FIG. 2 is an aberration curve of the optical imaging system illustrated in FIG. 1.
Figure 3:
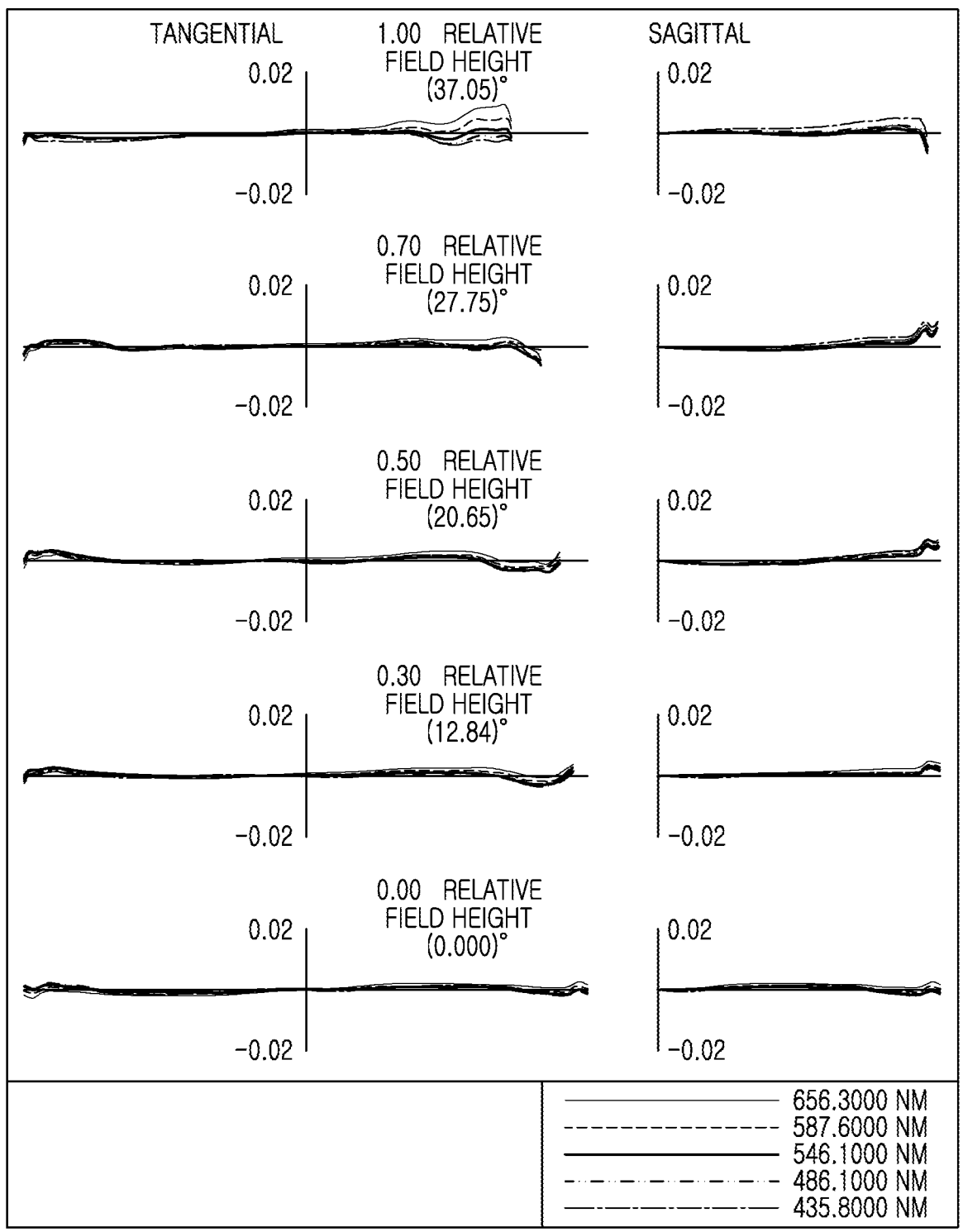
FIG. 3 is an aberration curve in a state of infinite focus of the optical imaging system illustrated in FIG. 1.
Figure 4:
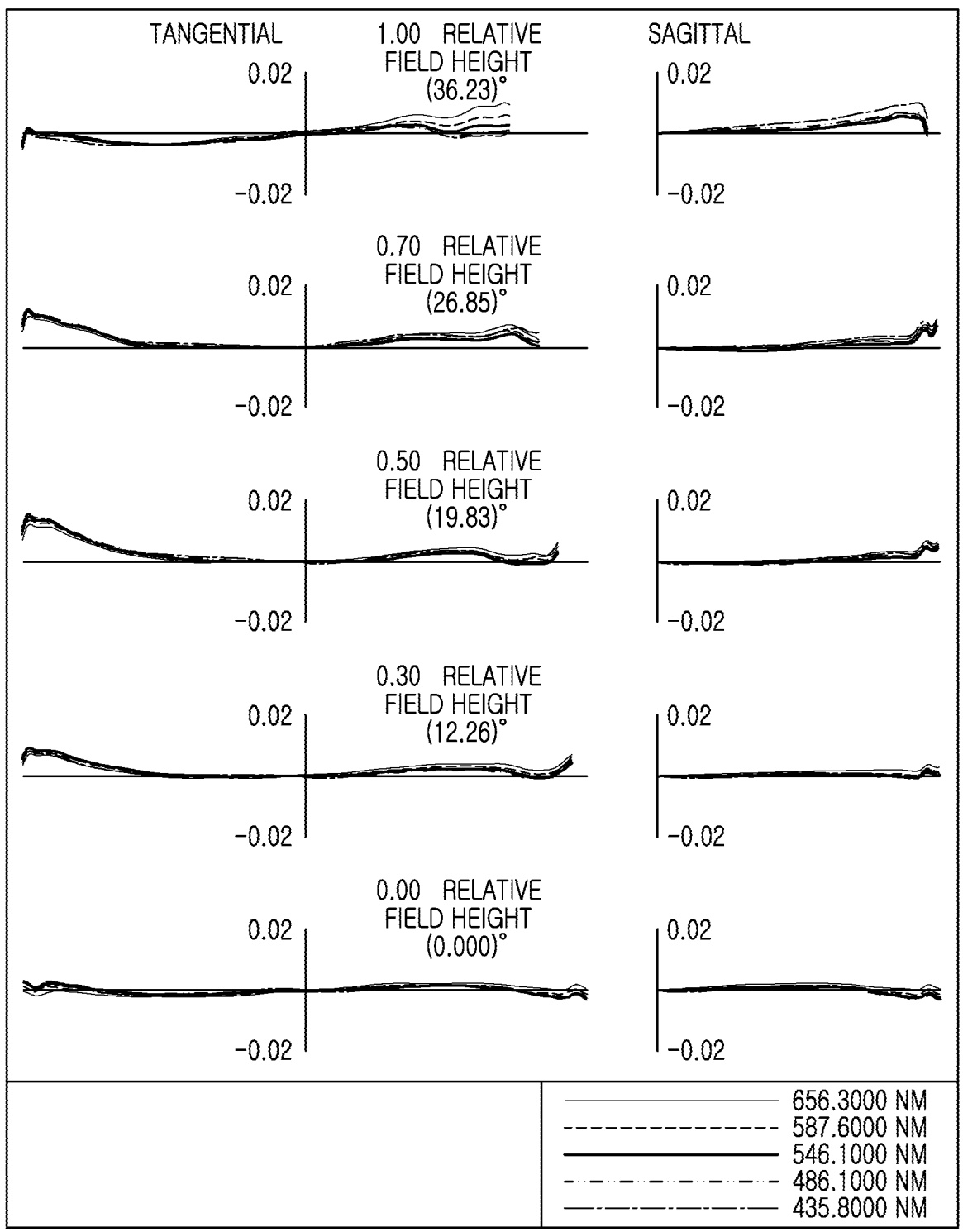
FIG. 4 is an aberration curve in a state of close focus of the optical imaging system illustrated in FIG. 1.

The optical imaging system 100 exhibits aberration characteristics and meridional aberration characteristics illustrated in FIGS. 2 to 4. Unlike a comparative example (see FIGS. 14 to 16), the optical imaging system 100 has improved astigmatism and meridional aberration in 0.4 to 0.7 field.

Table 1 illustrates lens characteristics of the optical imaging system 100, and Table 2 illustrates aspherical characteristics of the optical imaging system 100.

TABLE 1

| Surface No. | Remark | Radius of Curvature | Thickness/ Distance | Refractive Index | Abbe Number | Effective Radius |
|---|---|---|---|---|---|---|
| S1 | First | 2.0174 | 0.6750 | 1.544 | 56.10 | 1.100 |
| S2 | Lens | 13.2776 | 0.0850 | | | 1.055 |
| S3 | Second | 2.8176 | 0.2300 | 1.661 | 20.38 | 1.000 |
| S4 | Lens | 1.9728 | 0.4191 | | | 0.990 |
| S5 | Third | 11.4887 | 0.6750 | 1.544 | 56.10 | 1.074 |
| S6 | Lens | -5.4893 | 0.3015 | | | 1.242 |
| S7 | Fourth | -1.1885 | 0.3400 | 1.615 | 25.96 | 1.256 |
| S8 | Lens | -1.6206 | 0.0300 | | | 1.450 |
| S9 | Fifth | 2.9156 | 0.5536 | 1.544 | 56.10 | 1.757 |
| S10 | Lens | 3.4481 | 0.2336 | | | 2.193 |
| S11 | Sixth | 1.2780 | 0.4817 | 1.534 | 56.19 | 2.442 |
| S12 | Lens | 1.0558 | 0.2881 | | | 2.620 |
| S13 | Filter | infinity | 0.2100 | 1.523 | 65.40 | 2.866 |
| S14 | | infinity | 0.7000 | | | 2.915 |
| S15 | Imaging Plane | infinity | 0.0200 | | | 3.185 |

TABLE 2

| Surface No. | K | A | B | C | D |
|---|---|---|---|---|---|
| S1 | -0.9345419 | -0.0145229 | 0.4812408 | -5.2545002 | 36.0896861 |
| S2 | 0.0000000 | -0.1876985 | 0.3912438 | 1.0077202 | -16.3423709 |
| S3 | -1.8279144 | -0.3449102 | 0.8865081 | -4.4456806 | 34.4869435 |
| S4 | -2.7119549 | -0.1877800 | 0.0630454 | 2.5187591 | -18.6372665 |
| S5 | 0.0000000 | -0.1114136 | 0.5095979 | -4.5590199 | 25.9917022 |
| S6 | 5.5699203 | -0.1083297 | -0.0509004 | 0.8369519 | -3.3479317 |
| S7 | -0.5520165 | -0.0588301 | 0.2577208 | 1.2622888 | -10.9707564 |
| S8 | -1.6313295 | -0.0317093 | 0.1492798 | -0.9606120 | 2.6014315 |
| S9 | 0.4593941 | 0.1146494 | -0.2494100 | -0.0747229 | 0.6551327 |
| S10 | -2.5217639 | -0.1952237 | 0.9424256 | -2.1386601 | 2.8303534 |
| S11 | -4.1113892 | -0.4955179 | 0.7581094 | -0.9708829 | 0.9354449 |
| S12 | -1.2225254 | -0.5493672 | 0.6409374 | -0.6586294 | 0.5271340 |

| Surface No. | E | F | G | H | J |
|---|---|---|---|---|---|
| S1 | -164.4310693 | 517.2473749 | -1153.5881351 | 1850.2766545 | -2140.4067188 |
| S2 | 98.0797251 | -376.0407195 | 997.6614528 | -1878.1724015 | 2524.1523517 |
| S3 | -204.9144047 | 840.8609103 | -2428.9477537 | 5027.9488134 | -7498.9406951 |
| S4 | 84.4181456 | -267.9219625 | 613.7492827 | -1029.9186463 | 1279.2588894 |
| S5 | -99.1913931 | 257.3218909 | -451.7305044 | 513.7086180 | -320.4256447 |
| S6 | 4.5154184 | 8.3139433 | -46.0404587 | 93.1559317 | -112.7878969 |
| S7 | 37.3328711 | -75.6265493 | 102.6924938 | -98.4360912 | 67.8827165 |
| S8 | -4.5504445 | 6.3571663 | -7.1798161 | 6.1385590 | -3.7787864 |
| S9 | -1.1801732 | 1.4090637 | -1.2689517 | 0.8677959 | -0.4401689 |
| S10 | -2.5239463 | 1.6020181 | -0.7411954 | 0.2519480 | -0.0626979 |
| S11 | -0.7094266 | 0.4189650 | -0.1857959 | 0.0604882 | -0.0142818 |
| S12 | -0.3202111 | 0.1464030 | -0.0500564 | 0.0127294 | -0.0023890 |

Figure 5:
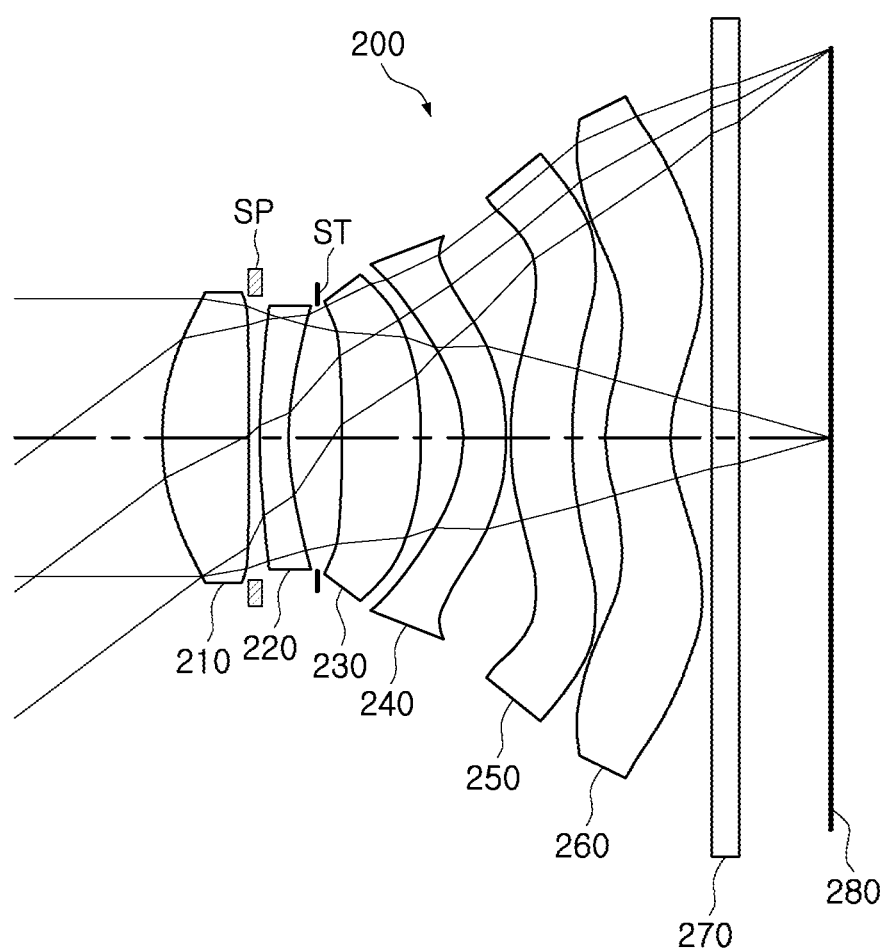
FIG. 5 illustrates a configuration of an optical imaging system according to a second example.

Hereinafter, an optical imaging system according to the second example will be described with reference to FIG. 5. The optical imaging system 200 may include a plurality of lenses, each having refractive power. For example, the optical imaging system 200 includes a first lens 210, a second lens 220, a third lens 230, a fourth lens 240, a fifth lens 250, and a sixth lens 260.

The first lens 210 has positive refractive power. In the first lens 210, an object-side surface is convex and an image-side surface is concave. The second lens 220 has negative refractive power. In the second lens 220, an object-side surface is convex and an image-side surface is concave. The third lens 230 has positive refractive power. In the third lens 230, an object-side surface is convex and an image-side surface is convex. The third lens 230 has a shape having an inflection point. For example, an inflection point may be formed on the object-side surface of the third lens 230. The fourth lens 240 has negative refractive power. In the fourth lens 240, an object-side surface is concave and an image-side surface is convex. The fifth lens 250 has positive refractive power. In the fifth lens 250, an object-side surface is convex and an image-side surface is concave. The fifth lens 250 has a shape having an inflection point. For example, an inflection point may be formed on each of the object-side surface and the image-side surface of the fifth lens 250. Both concave and convex shapes are formed on one surface of the fifth lens 250. For example, the object-side surface of the fifth lens 250 is convex in a paraxial region and concave around the paraxial region, and the image-side surface of the fifth lens 250 is concave in the paraxial region and convex around the paraxial region. The sixth lens 260 has negative refractive power. In the sixth lens 260, an object-side surface is convex and an image-side surface is concave. The sixth lens 260 has a shape having an inflection point. For example, an inflection point may be formed on an object-side surface and an image-side surface of the sixth lens 260. Both concave and convex shapes may be formed on one surface the sixth lens 260. For example, the object-side surface of the sixth lens 260 is convex in a paraxial region and concave around the paraxial region and the image-side surface of the sixth lens 260 is concave in the paraxial region and convex around the paraxial region.

Among the first lens 210 to the sixth lens 260, the second lens 220 may have the highest refractive index. For example, the second lens 220 may have a refractive index of 1.65 or more, but the other lenses may have a refractive index of less than 1.65. Among the first lens 210 to the sixth lens 260, the second lens 220 may have the smallest Abbe number. For example, the second lens 220 may have an Abbe number less than 21, but the other lenses may have an Abbe number of 21 or more.

The optical imaging system 200 includes a stop ST. For example, the stop ST is disposed between the second lens 220 and the third lens 230. The stop ST may control the amount of light incident on an imaging plane 280. The optical imaging system 200 includes one or more gap maintaining members SP. The gap maintaining member SP can maintain a constant distance between two lenses. In addition, the gap maintaining member SP may reduce the scattered light generated between the two lenses. In this example, the gap maintaining member SP is disposed between the first lens 210 and the second lens 220. A projection, protruding in a direction intersecting the optical axis, is formed on an internal circumferential surface of the gap maintaining member SP. The gap maintaining member SP may have one of the shapes illustrated in FIGS. 17 to 20.

The optical imaging system 200 includes a filter 270. For example, the filter 270 is disposed between the sixth lens 260 and the imaging plane 280. The filter 270 may block light having a specific wavelength from being incident. For example, the filter 270 may block infrared rays from being incident on the imaging plane 280. The optical imaging system 200 includes an image sensor. The image sensor provides an imaging plane 280 on which light refracted through the lenses is imaged. The image sensor converts the optical signal, imaged on the imaging plane 280, into an electrical signal.

Figure 6:
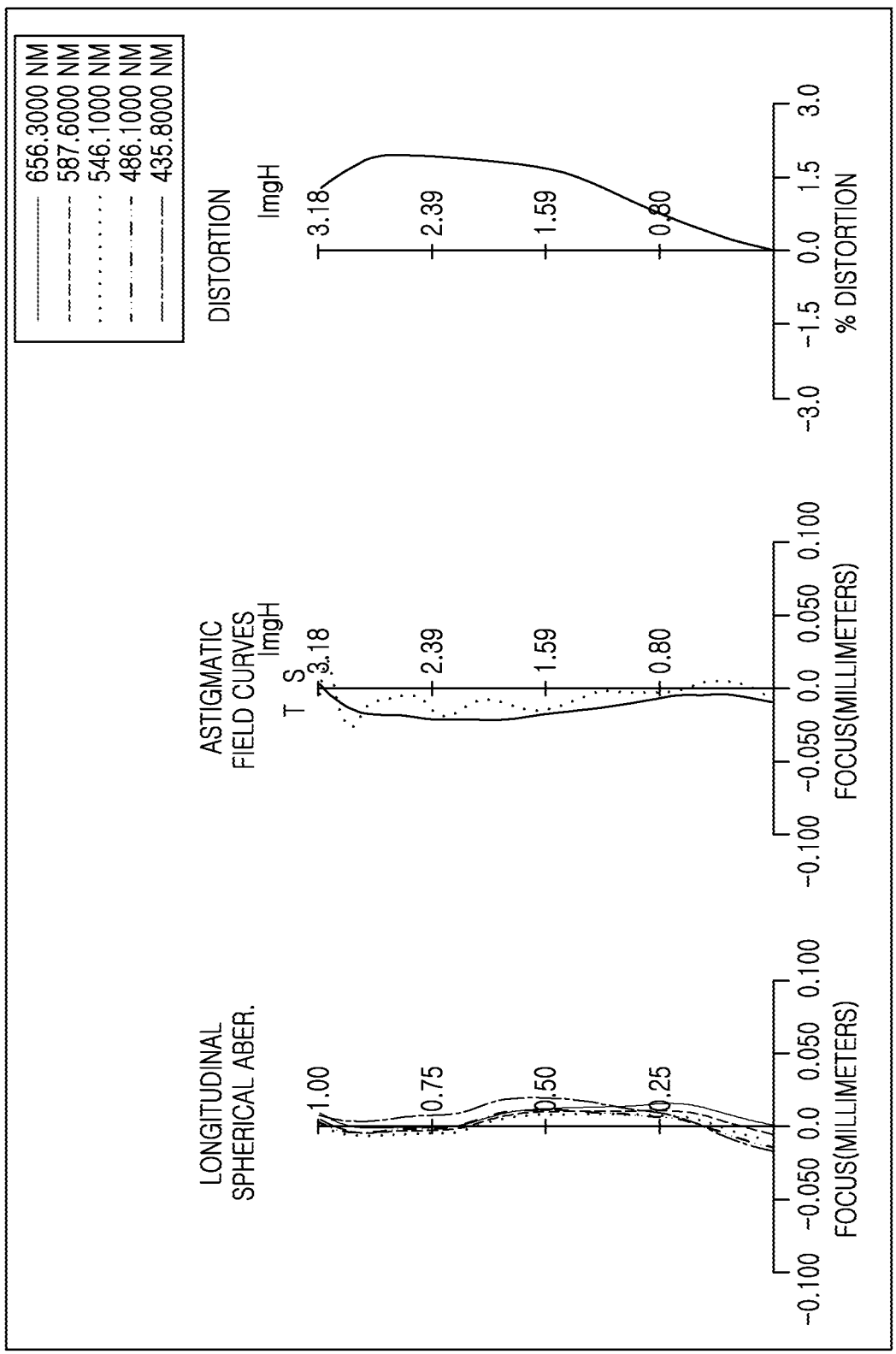
FIG. 6 is an aberration curve of the optical imaging system illustrated in FIG. 5.
Figure 7:
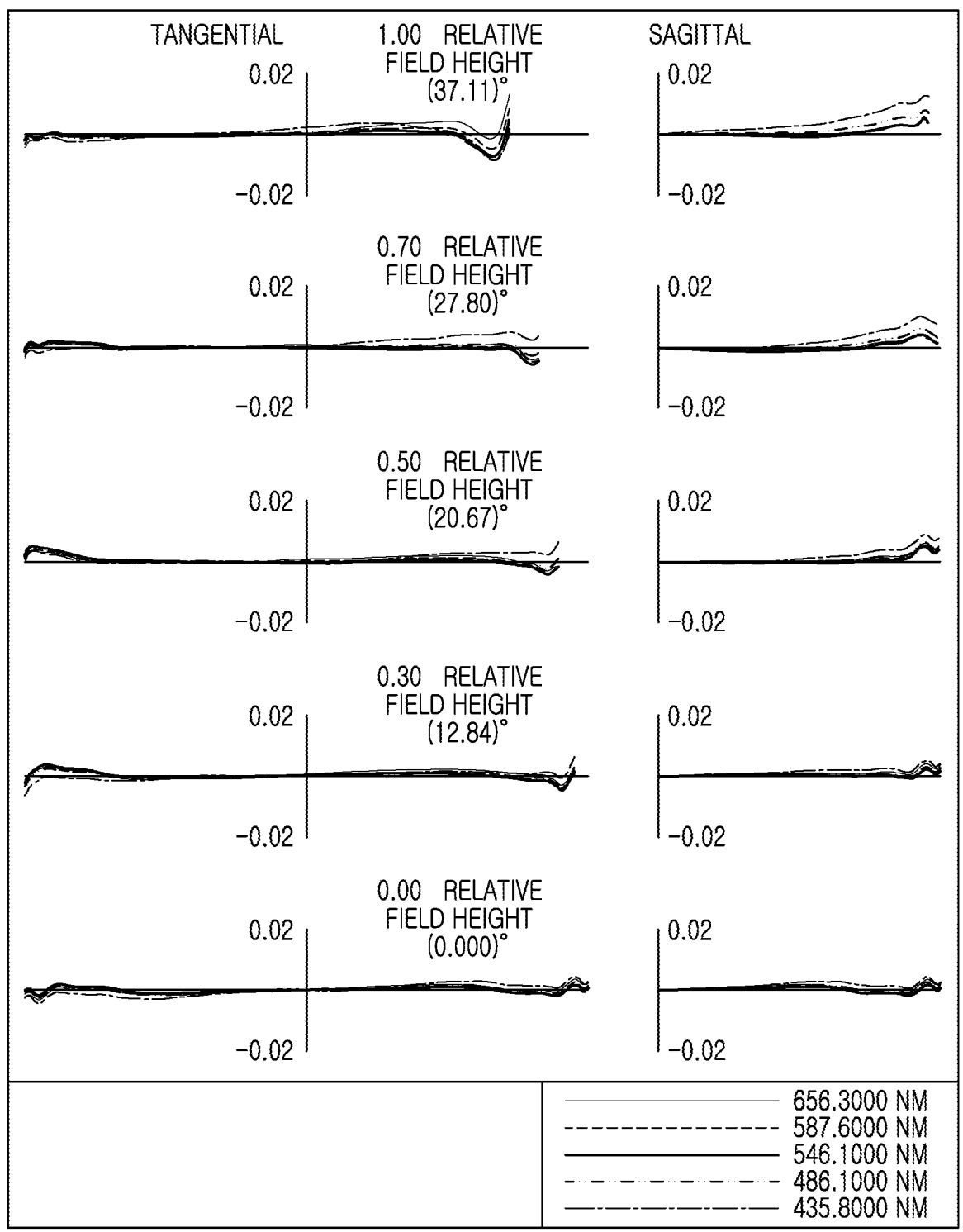
FIG. 7 is an aberration curve in a state of infinite focus of the optical imaging system illustrated in FIG. 5.
Figure 8:
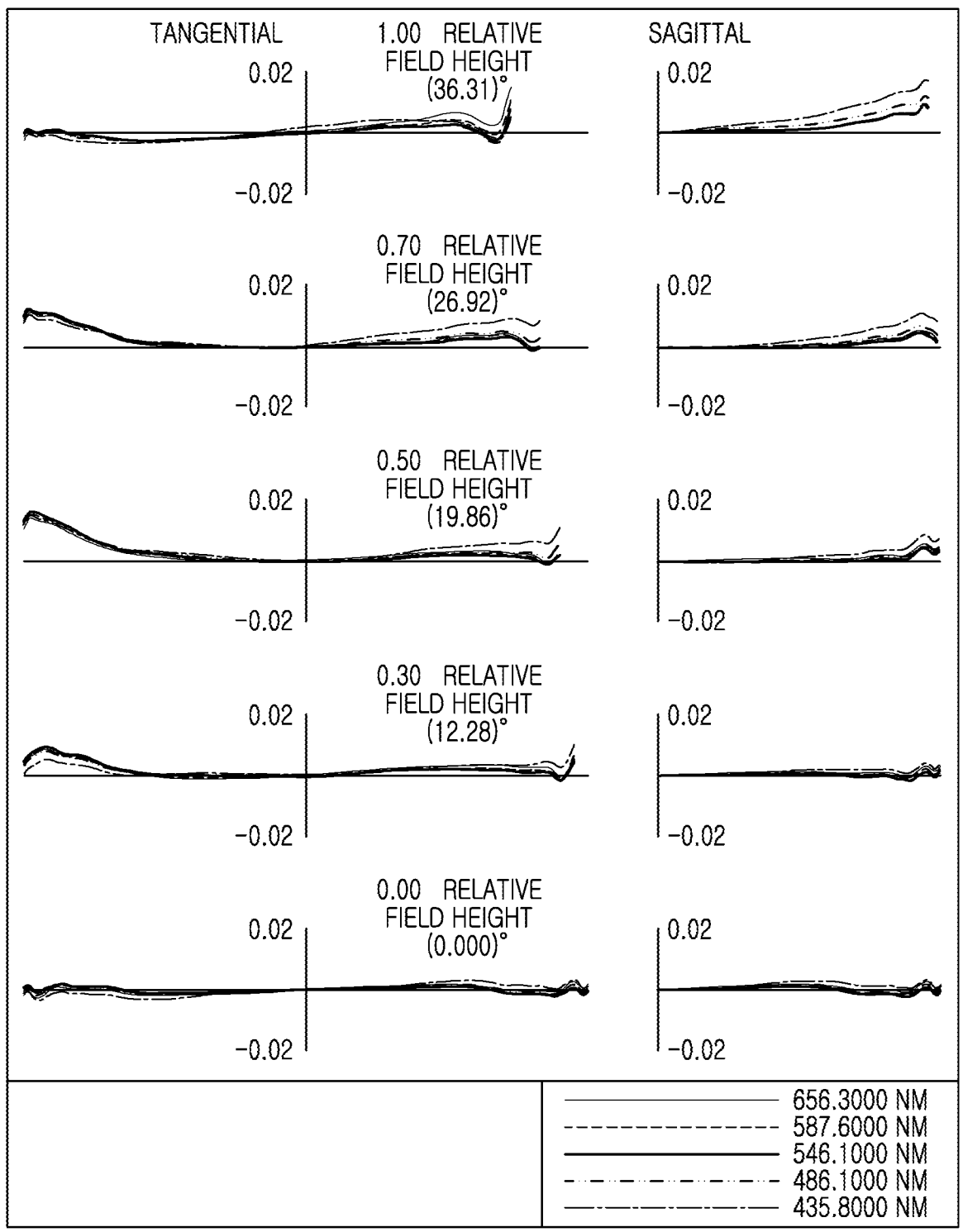
FIG. 8 is an aberration curve in a state of a close focus of the optical imaging system illustrated in FIG. 5.

The optical imaging system 200 according to this example exhibits aberration characteristics and meridional aberration characteristics illustrated in FIGS. 6 to 8. Unlike the comparative example (see FIGS. 14 to 16), the optical imaging system 200 has improved astigmatism and meridional aberration in the 0.4 to 0.7 field.

Table 3 illustrates lens characteristics of the optical imaging system 200, and Table 4 illustrates aspherical characteristics of the optical imaging system 200.

TABLE 3

| Surface No. | Remark | Radius of Curvature | Thickness/ Distance | Refractive Index | Abbe Number | Effective Radius |
|---|---|---|---|---|---|---|
| S1 | First Lens | 1.9854 | 0.6750 | 1.544 | 56.10 | 1.100 |
| S2 | | 13.6238 | 0.0850 | | | 1.070 |
| S3 | Second | 3.2161 | 0.2300 | 1.671 | 19.24 | 1.000 |
| S4 | Lens | 2.1809 | 0.4149 | | | 0.975 |
| S5 | Third Lens | 118.6623 | 0.6283 | 1.544 | 56.10 | 1.046 |
| S6 | | −4.0314 | 0.3327 | | | 1.223 |
| S7 | Fourth | −1.2021 | 0.3400 | 1.615 | 25.96 | 1.259 |
| S8 | Lens | −1.8415 | 0.0300 | | | 1.470 |
| S9 | Fifth Lens | 2.6237 | 0.4900 | 1.544 | 56.10 | 1.855 |
| S10 | | 3.9252 | 0.2626 | | | 2.230 |
| S11 | Sixth Lens | 1.2183 | 0.5100 | 1.534 | 56.19 | 2.508 |
| S12 | | 1.0181 | 0.3205 | | | 2.672 |
| S13 | Filter | infinity | 0.2100 | 1.523 | 65.40 | 2.897 |
| S14 | | infinity | 0.7091 | | | 2.943 |
| S15 | Imaging Plane | infinity | 0.0098 | | | 3.189 |

TABLE 4

| Surface No. | K | A | B | C | D |
|---|---|---|---|---|---|
| S1 | −0.8613815 | −0.0011020 | 0.2355946 | −2.5185118 | 17.5164646 |
| S2 | 0.0000000 | −0.1461638 | 0.3616669 | −1.2264084 | 8.3422655 |
| S3 | −0.5764498 | −0.2571018 | 0.4263302 | −0.6432469 | 1.5938961 |
| S4 | −1.8500089 | −0.1542909 | 0.2285665 | −0.8176130 | 7.9553391 |
| S5 | 0.0000000 | −0.1119142 | 0.7988917 | −9.4194407 | 71.3648881 |
| S6 | 3.0223868 | −0.0998020 | −0.0031106 | 1.3046746 | −9.0537311 |
| S7 | −0.6286556 | −0.0723408 | −0.0615351 | 4.2110724 | −24.0077022 |
| S8 | −1.3879727 | −0.0564617 | −0.3180760 | 2.0555920 | −6.7177534 |
| S9 | −0.9000316 | 0.1397118 | −0.4514979 | 0.9493567 | −1.7688005 |

TABLE 4-continued

| | | | | | |
|---|---|---|---|---|---|
| S10 | −5.1820014 | −0.0637589 | 0.5331495 | −1.1511188 | 1.3120574 |
| S11 | −3.2112108 | −0.4462566 | 0.5422899 | −0.5278158 | 0.3625892 |
| S12 | −1.1207533 | −0.5200728 | 0.5276566 | −0.4630099 | 0.3073191 |

| Surface No. | E | F | G | H | J |
|---|---|---|---|---|---|
| S1 | −82.6987678 | 273.1978773 | −644.6895736 | 1098.1515921 | −1350.7675137 |
| S2 | −52.3487077 | 223.6336927 | −649.8019758 | 1312.5241369 | −1862.6222948 |
| S3 | −0.1845992 | −45.4981310 | 284.9145486 | −919.5744001 | 1847.2400418 |
| S4 | −52.2806345 | 220.1721179 | −631.7359140 | 1273.6842088 | −1819.8213505 |
| S5 | −370.4101215 | 1356.1372342 | −3569.4903983 | 6814.6846515 | −9428.9087104 |
| S6 | 33.1947259 | −78.5080435 | 128.0433112 | −147.9848345 | 121.9870604 |
| S7 | 74.1329222 | −148.6192927 | 206.7354007 | −205.2259549 | 146.5134021 |
| S8 | 13.6690915 | −18.4689538 | 17.2812598 | −11.4572783 | 5.4233329 |
| S9 | 2.3770794 | −2.2091281 | 1.4335399 | −0.6574893 | 0.2137724 |
| S10 | −0.9637618 | 0.4898474 | −0.1779165 | 0.0468085 | −0.0089275 |
| S11 | −0.1846423 | 0.0751439 | −0.0250554 | 0.0066852 | −0.0013717 |
| S12 | −0.1492794 | 0.0524099 | −0.0131026 | 0.0022702 | −0.0002568 |

Figure 9:
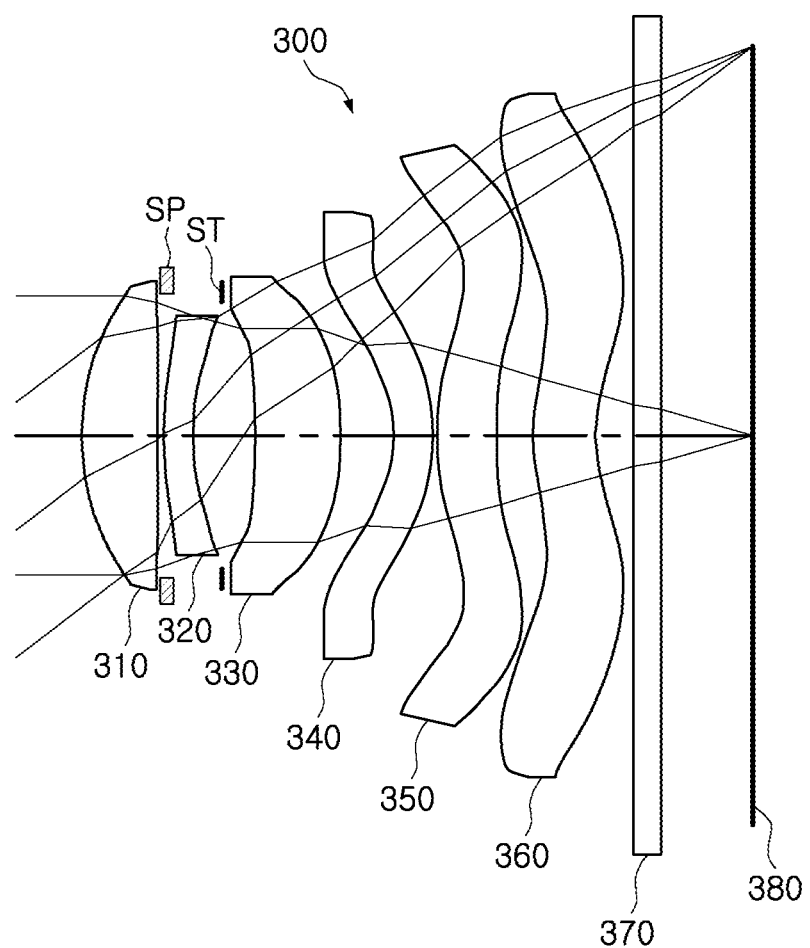
FIG. 9 illustrates a configuration of an optical imaging system according to a third example.

Hereinafter, an optical imaging system according to a third example will be described with reference to FIG. 9. The optical imaging system 300 may include a plurality of lenses, each having refractive power. For example, the optical imaging system 300 includes a first lens 310, a second lens 320, a third lens 330, a fourth lens 340, a fifth lens 350, and a sixth lens 360.

The first lens 310 has positive refractive power. In the first lens, an object-side surface is convex and an image-side surface is concave. The second lens 320 has negative refractive power. In the second lens 320, an object-side surface is convex and an image-side surface is concave. The third lens 330 has positive refractive power. In the third lens, an object-side surface is convex and an image-side surface is convex. The third lens 330 has a shape having an inflection point. For example, an inflection point may be formed on the object-side surface of the third lens 330. The fourth lens 340 has negative refractive power. In the fourth lens 340, an object-side surface is concave and an image-side surface is convex. The fifth lens 350 has positive refractive power. In the fifth lens, an object-side surface is convex and an image-side surface is concave. The fifth lens 350 has a shape having an inflection point. For example, an inflection point may be formed on each of the object-side surface and the image-side surface of the fifth lens 350. Both concave and convex shapes are formed on one surface of the fifth lens 350. For example, the object-side surface of the fifth lens 350 is convex in the paraxial region and concave around the paraxial region, and the image-side surface of the fifth lens 350 is concave in the paraxial region and convex around the paraxial region. The sixth lens 360 has negative refractive power. In the sixth lens 360, an object-side surface is convex and an image-side surface is concave. The sixth lens 360 has a shape having an inflection point. For example, an inflection point may be formed on each of the object-side surface and an image-side surface of the sixth lens 360. Both concave and convex shapes may be formed on one surface of the sixth lens 360. For example, the object-side surface of the sixth lens 360 is convex in the paraxial region and concave around the paraxial region, and the image-side surface of the sixth lens 360 is concave in the paraxial region and convex around the paraxial region.

Among the first lens 310 to the sixth lens 360, the second lens 320 may have the highest refractive index. For example, the second lens 320 may have a refractive index of 1.65 or more, but the other lenses may have a refractive index of less than 1.65. Among the first lenses 310 to sixth lenses 360, the second lens 320 may have the smallest Abbe number. For example, the second lens 320 may have an Abbe number less than 21, but the other lenses may have an Abbe number of 21 or more.

The optical imaging system 300 includes a stop ST. For example, the stop ST is disposed between the second lens 320 and the third lens 330. The stop ST can control the amount of light incident on an imaging plane 380. The optical imaging system 300 includes one or more gap maintaining members SP. The gap maintaining member SP may maintain a constant distance between two lenses. In addition, the gap maintaining member SP may reduce the scattered light generated between the two lenses. In this example, the gap maintaining member SP is disposed between the first lens 310 and the second lens 320. A projection, protruding in a direction intersecting the optical axis, is formed on an internal circumferential surface of the gap maintaining member SP. The gap maintaining member SP may have one of the shapes illustrated in FIGS. 17 to 20.

The optical imaging system 300 includes a filter 370. For example, the filter 370 is disposed between the sixth lens 360 and the image plane 380. The filter 370 may block light having a specific wavelength from being incident. For example, the filter 370 may block infrared rays from being incident on the imaging plane 380. The optical imaging system 300 includes an image sensor. The image sensor provides an imaging plane 380 on which light refracted through the lenses is imaged. The image sensor converts the optical signal, imaged on the imaging plane 380, into an electrical signal.

Figure 10:
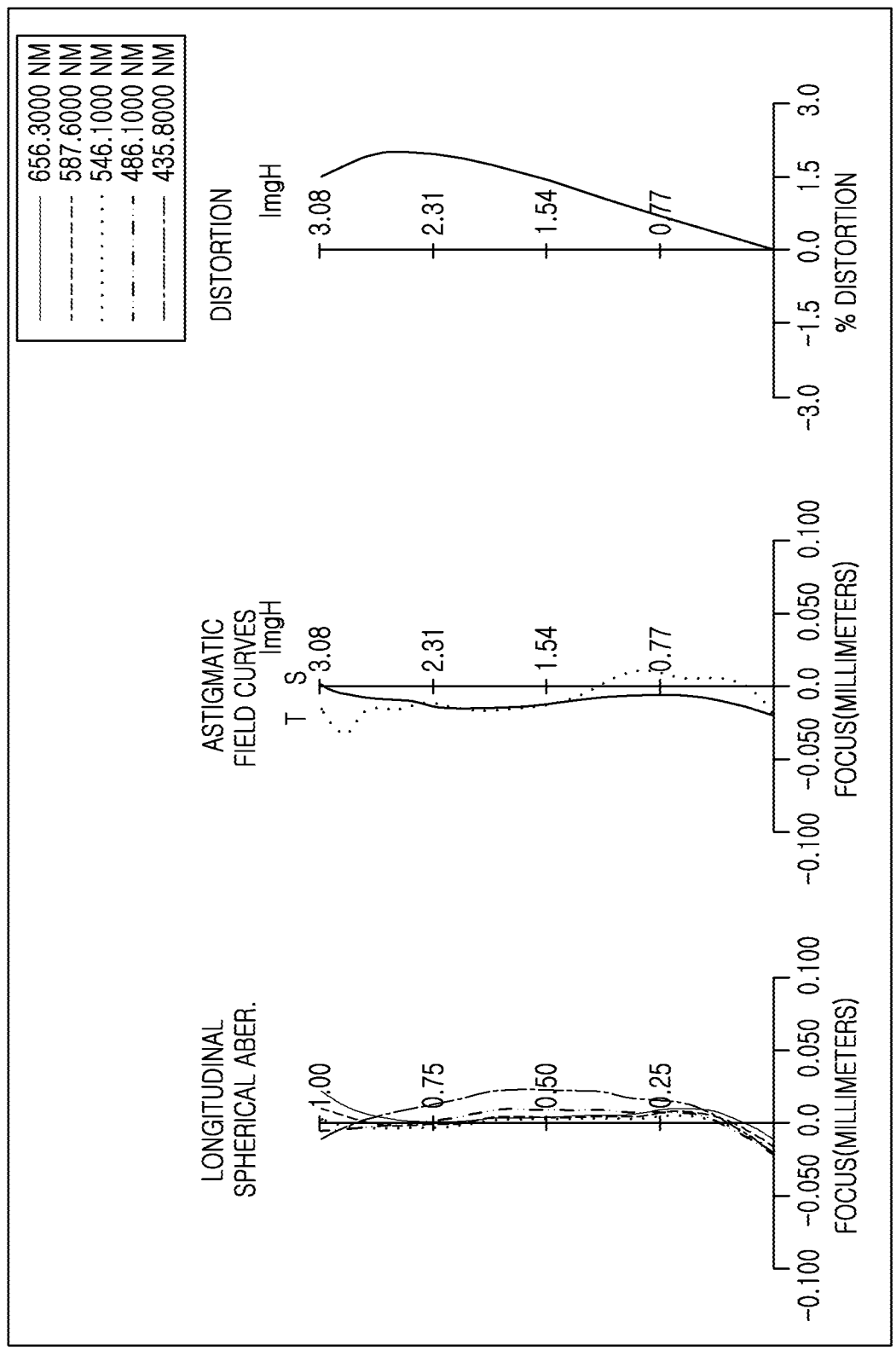
FIG. 10 is an aberration curve of the optical imaging system illustrated in FIG. 9.
Figure 11:
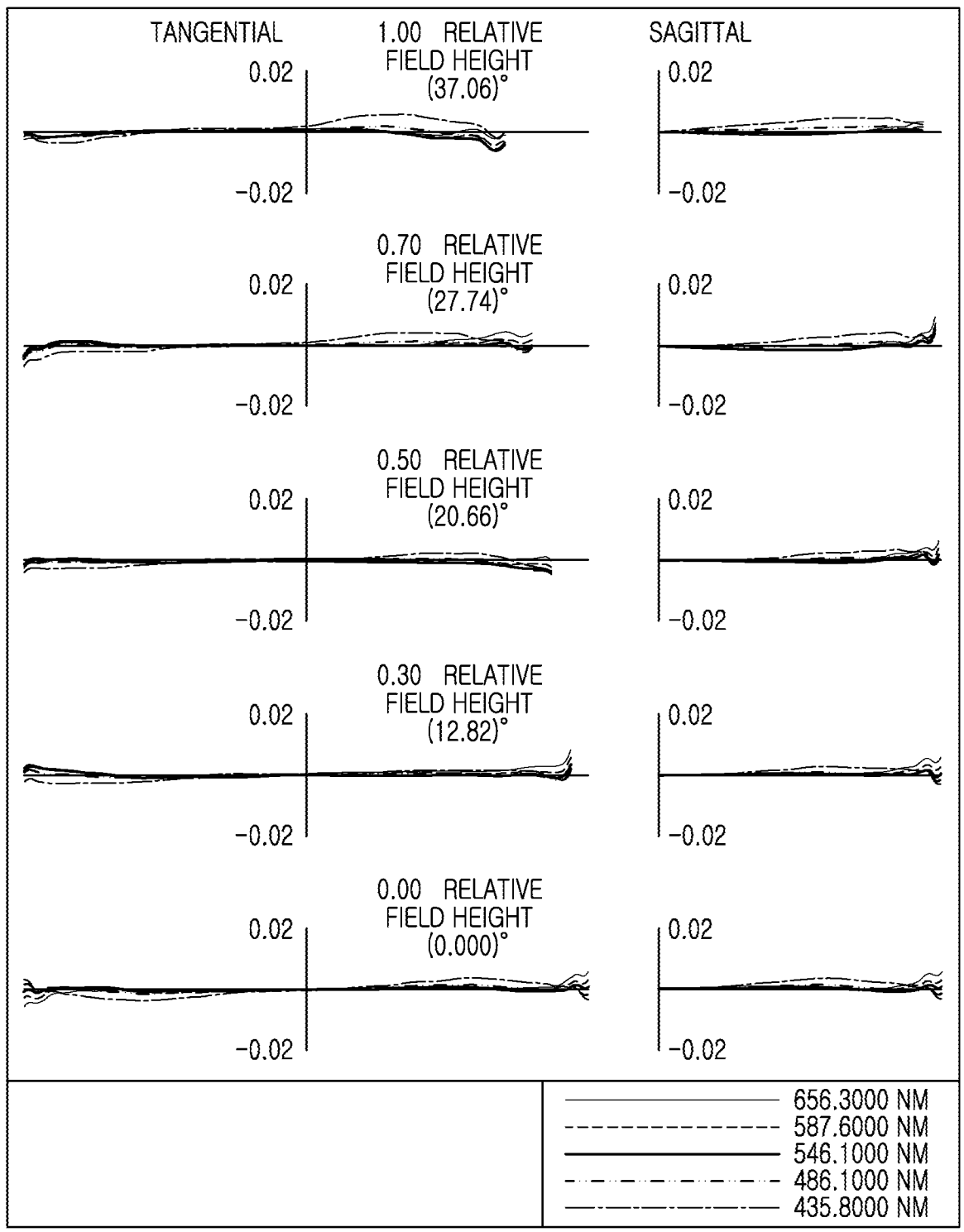
FIG. 11 is an aberration curve in a state of infinite focus of the optical imaging system illustrated in FIG. 9.
Figure 12:
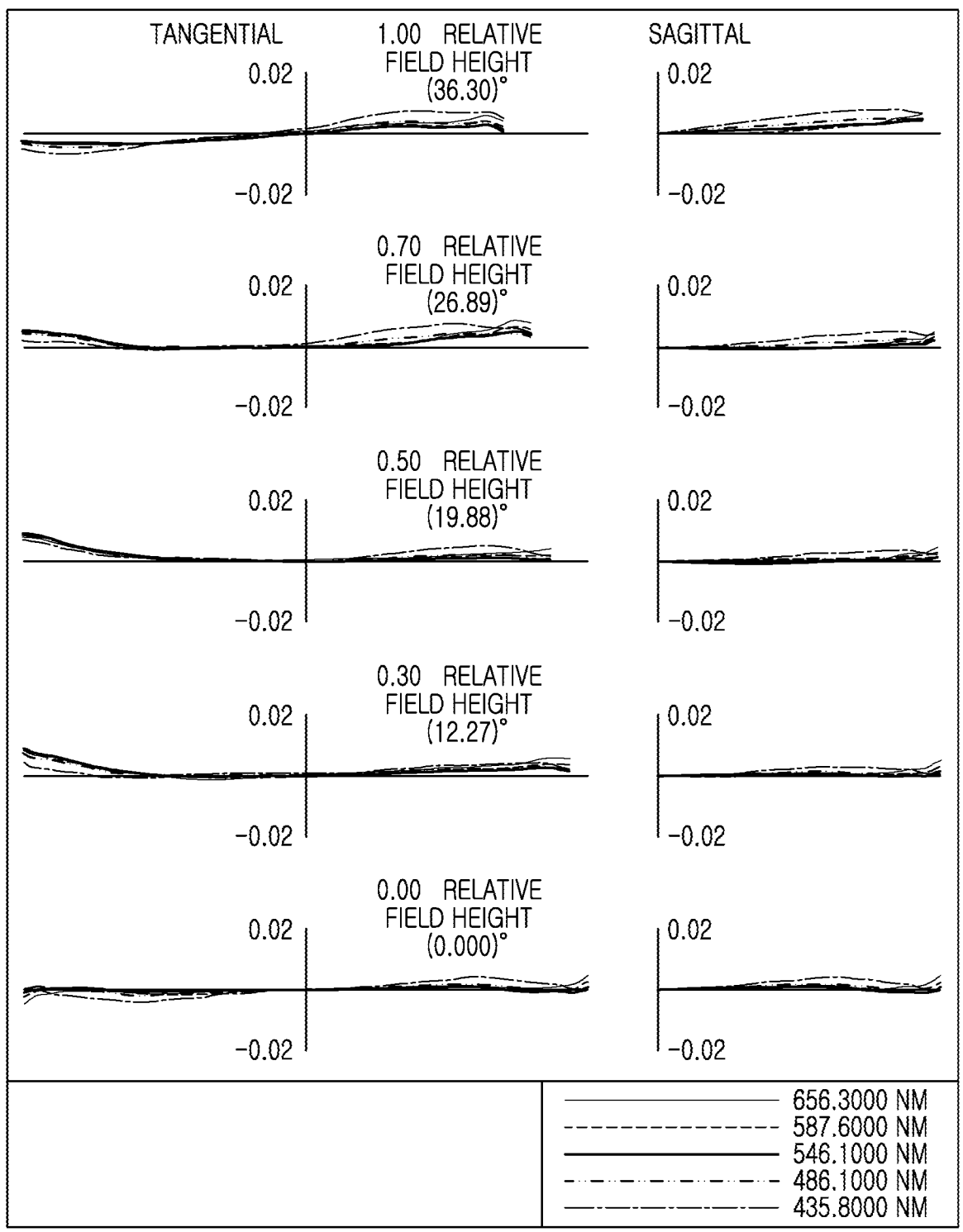
FIG. 12 is an aberration curve in a state of a close focus of the optical imaging system illustrated in FIG. 9.

The optical imaging system 300 exhibits aberration characteristics and meridional aberration characteristics illustrated in FIGS. 10 to 12. Unlike the comparative example (see FIGS. 14 to 16), the optical imaging system 300 has improved astigmatism and meridional aberration in 0.4 to 0.7 fields.

Table 5 below illustrates lens characteristics of the optical imaging system 300, and Table 6 illustrates aspherical characteristics of the optical imaging system 300.

TABLE 5

| Surface No. | Remark | Radius of Curvature | Thickness/ Distance | Refractive Index | Abbe Number | Effective Radius |
|---|---|---|---|---|---|---|
| S1 | First | 1.9652 | 0.5884 | 1.544 | 56.10 | 1.100 |
| S2 | Lens | 13.1221 | 0.0547 | | | 1.070 |
| S3 | Second | 2.4217 | 0.2300 | 1.671 | 19.24 | 0.993 |

TABLE 5-continued

| Surface No. | Remark | Radius of Curvature | Thickness/ Distance | Refractive Index | Abbe Number | Effective Radius |
|---|---|---|---|---|---|---|
| S4 | Lens | 1.7206 | 0.4861 | | | 0.933 |
| S5 | Third | −11.8828 | 0.6741 | 1.544 | 56.10 | 0.998 |
| S6 | Lens | −2.6313 | 0.4195 | | | 1.219 |
| S7 | Fourth | −1.0590 | 0.3100 | 1.635 | 23.97 | 1.386 |
| S8 | Lens | −1.6391 | 0.0300 | | | 1.585 |
| S9 | Fifth | 2.2612 | 0.4672 | 1.544 | 56.10 | 1.962 |
| S10 | Lens | 4.7029 | 0.2883 | | | 2.257 |
| S11 | Sixth | 1.4277 | 0.4883 | 1.534 | 56.19 | 2.520 |
| S12 | Lens | 1.0647 | 0.3033 | | | 2.670 |
| S13 | Filter | infinity | 0.2100 | 1.523 | 65.40 | 2.884 |
| S14 | | infinity | 0.7000 | | | 2.931 |
| S15 | Imaging Plane | infinity | 0.0200 | | | 3.186 |

TABLE 6

| Surface No. | K | A | B | C | D |
|---|---|---|---|---|---|
| S1 | −0.4901683 | 0.0064955 | 0.1518187 | −1.7733076 | 13.5301188 |
| S2 | 0.0000000 | −0.1887188 | 0.4296170 | 3.0191753 | −39.7611307 |
| S3 | −0.9904768 | −0.3392782 | 1.5830767 | −13.8529239 | 113.9185761 |
| S4 | −1.4054679 | −0.1281742 | −0.6320227 | 14.5607658 | −153.7667249 |
| S5 | 0.0000000 | −0.0931139 | 0.3811877 | −5.2421242 | 42.2047784 |
| S6 | 0.0370984 | −0.0656054 | −0.2508444 | 2.8341309 | −17.6065837 |
| S7 | −1.0260775 | −0.0058968 | 0.3682487 | −0.8065386 | 0.2518739 |
| S8 | −1.1908190 | −0.0694792 | −0.0592048 | 0.7965457 | −3.0479944 |
| S9 | −0.7477441 | 0.0890286 | −0.3967924 | 0.8454206 | −1.5478159 |
| S10 | 1.0691117 | 0.1163219 | 0.0121664 | −0.3162769 | 0.4484465 |
| S11 | −2.0048278 | −0.4266512 | 0.4033477 | −0.3283254 | 0.2330966 |
| S12 | −1.0286537 | −0.5096396 | 0.4987939 | −0.4539548 | 0.3418740 |

| Surface No. | E | F | G | H | J |
|---|---|---|---|---|---|
| S1 | −69.2349998 | 245.2800856 | −615.2224141 | 1106.3955688 | −1430.0779187 |
| S2 | 234.2869120 | −884.7130958 | 2315.0529042 | −4318.8464893 | 5789.6557813 |
| S3 | −674.6112328 | 2801.4922510 | −8269.0692839 | 17549.995116 | −26847.994718 |
| S4 | 1038.6875555 | −4796.5454173 | 15637.2047239 | −36591.455944 | 61724.757723 |
| S5 | −234.5272657 | 919.6456851 | −2587.6427949 | 5259.8109683 | −7704.6651495 |
| S6 | 69.0898472 | −186.4838164 | 359.5056369 | −503.2331918 | 512.7645507 |
| S7 | 2.0978665 | −3.9909583 | 2.2084105 | 2.3621133 | −5.3406628 |
| S8 | 7.0711886 | −10.9139613 | 11.8559373 | −9.3157303 | 5.3292127 |
| S9 | 2.0899398 | −2.0077834 | 1.3802775 | −0.6840096 | 0.2440808 |
| S10 | −0.3550282 | 0.1880266 | −0.0706402 | 0.0192480 | −0.0038230 |
| S11 | −0.1520038 | 0.0849217 | −0.0363785 | 0.0113140 | −0.0025102 |
| S12 | −0.2048001 | 0.0953263 | −0.0338937 | 0.0090789 | −0.0018046 |

Tables 7 and 8 illustrate optical characteristic values and conditional expression values of the optical imaging systems according to the first to third examples.

TABLE 7

| Remark | First Example | Second Example | Third Example |
|---|---|---|---|
| f1 | 4.282 | 4.186 | 4.170 |
| f2 | −11.169 | −11.092 | −10.205 |
| f3 | 6.924 | 7.179 | 6.056 |
| f4 | −10.348 | −7.058 | −5.947 |
| f5 | 25.394 | 12.839 | 7.499 |
| f6 | −46.282 | −102.234 | −14.748 |
| TTL | 5.243 | 5.248 | 5.270 |
| f | 4.007 | 4.005 | 4.004 |
| f number | 1.822 | 1.820 | 1.820 |
| FOV | 75.00 | 75.04 | 75.05 |
| ImgH | 3.075 | 3.075 | 3.075 |

TABLE 8

| Conditional Expression | First Example | Second Example | Third Example |
|---|---|---|---|
| CT3/TTL | 0.129 | 0.120 | 0.128 |
| f3/f | 1.728 | 1.792 | 1.513 |
| f/ImgH | 1.303 | 1.302 | 1.302 |
| TTL/f | 1.308 | 1.310 | 1.316 |

Figure 13:
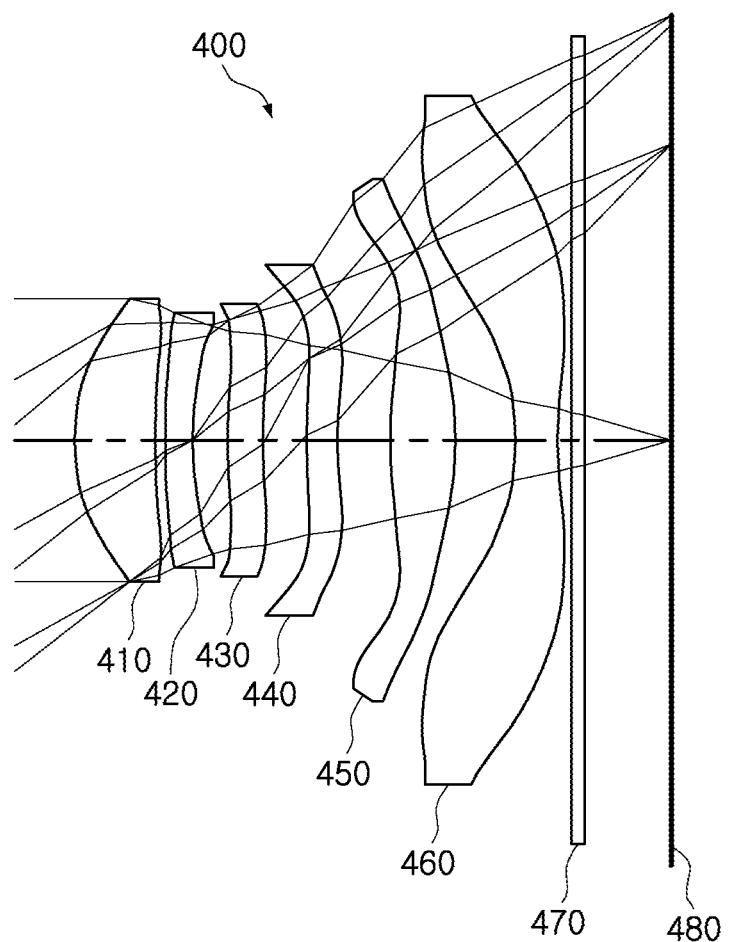
FIG. 13 illustrates a configuration of an optical imaging system according to a comparative example.
Figure 14:
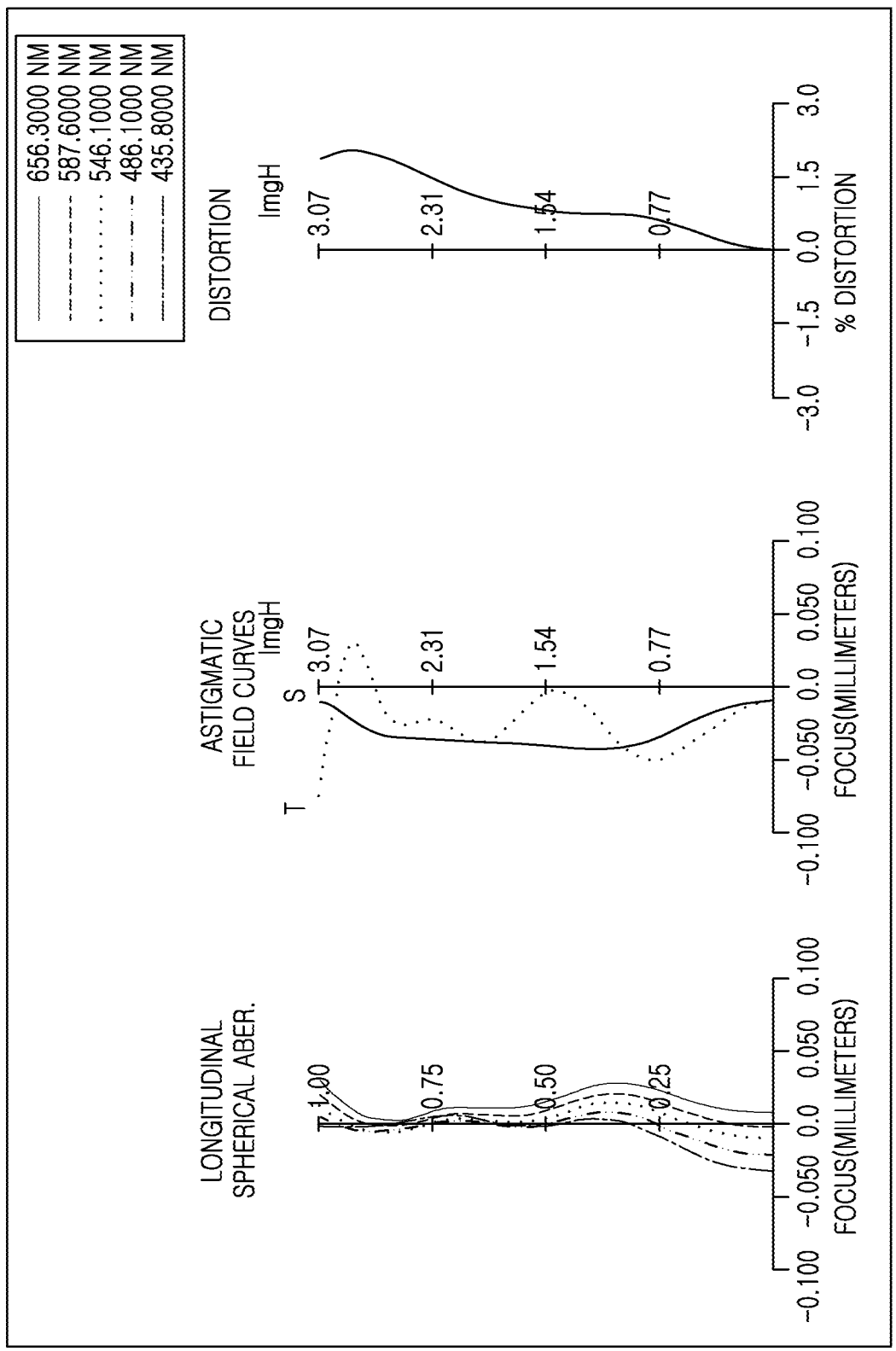
FIG. 14 is an aberration curve of the optical imaging system illustrated in FIG. 13.
Figure 15:
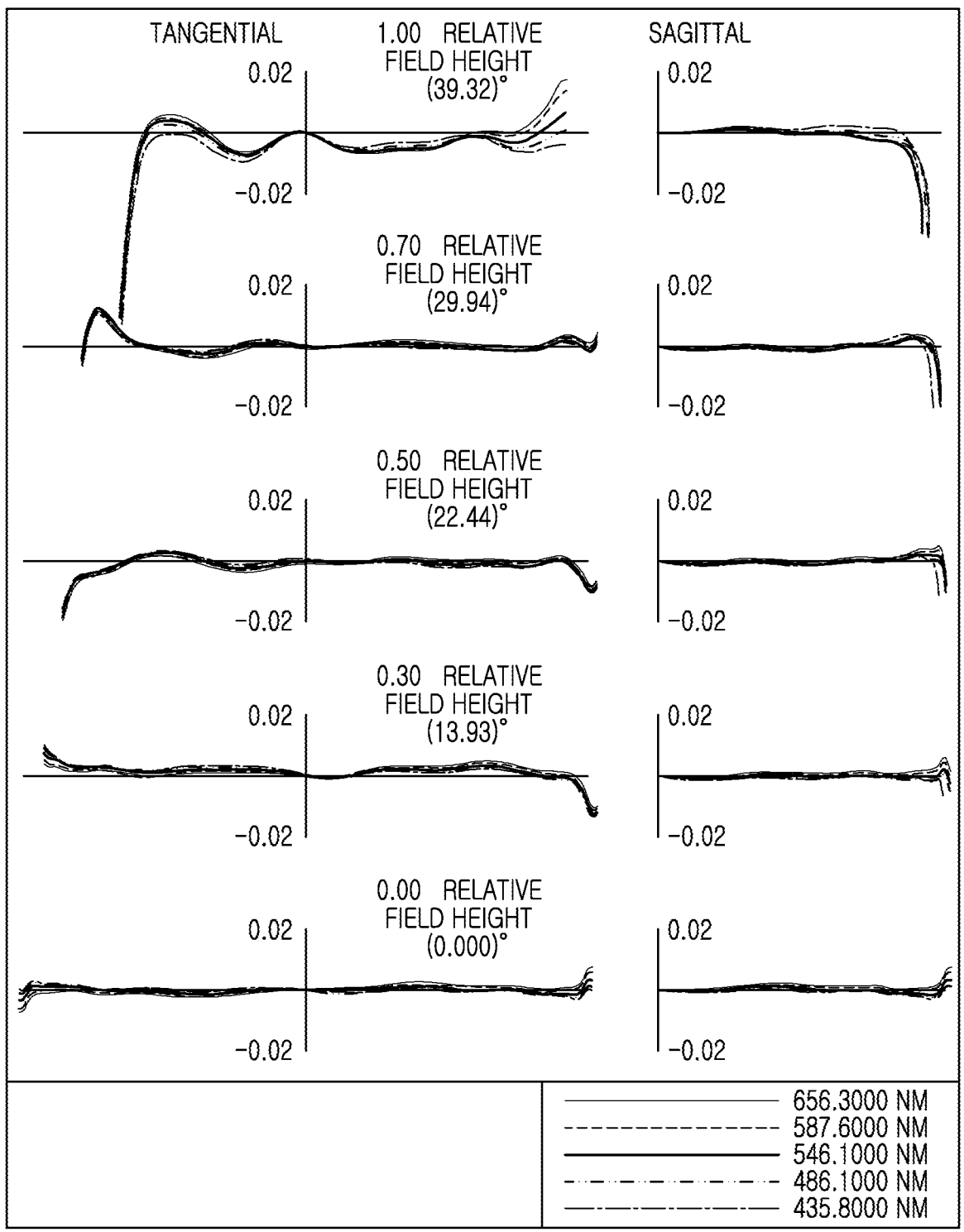
FIG. 15 is an aberration curve in a state of infinite focus of the optical imaging system illustrated in FIG. 13.
Figure 16:
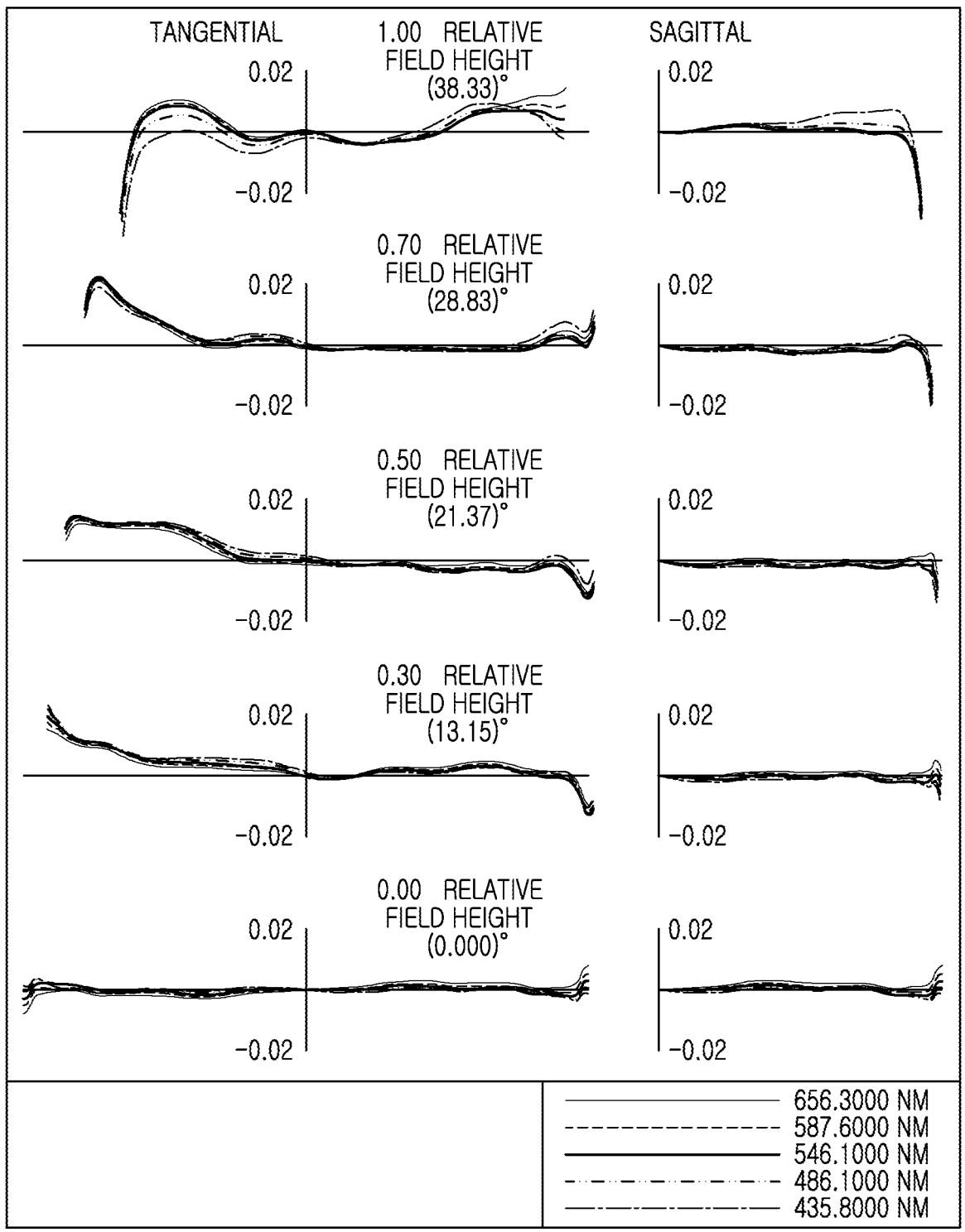
FIG. 16 is an aberration curve in a state of a close focus of the optical imaging system illustrated in FIG. 13.
Figure 17:
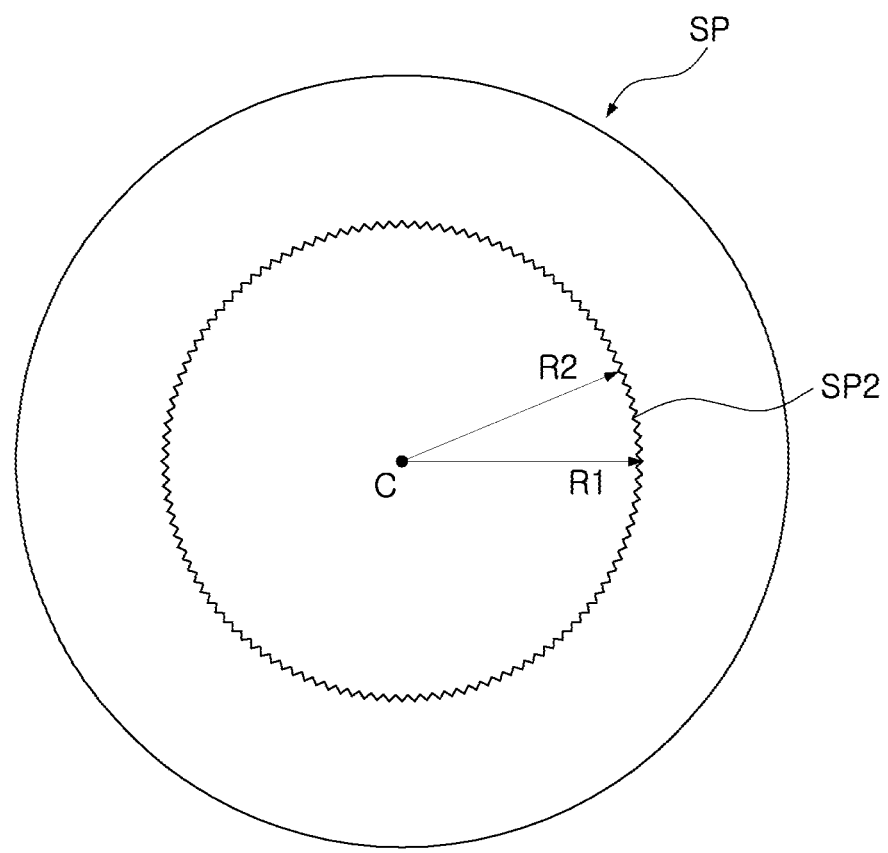
FIG. 17 is a plan view of an example of a gap maintaining member provided in an optical imaging system.
Figure 18:
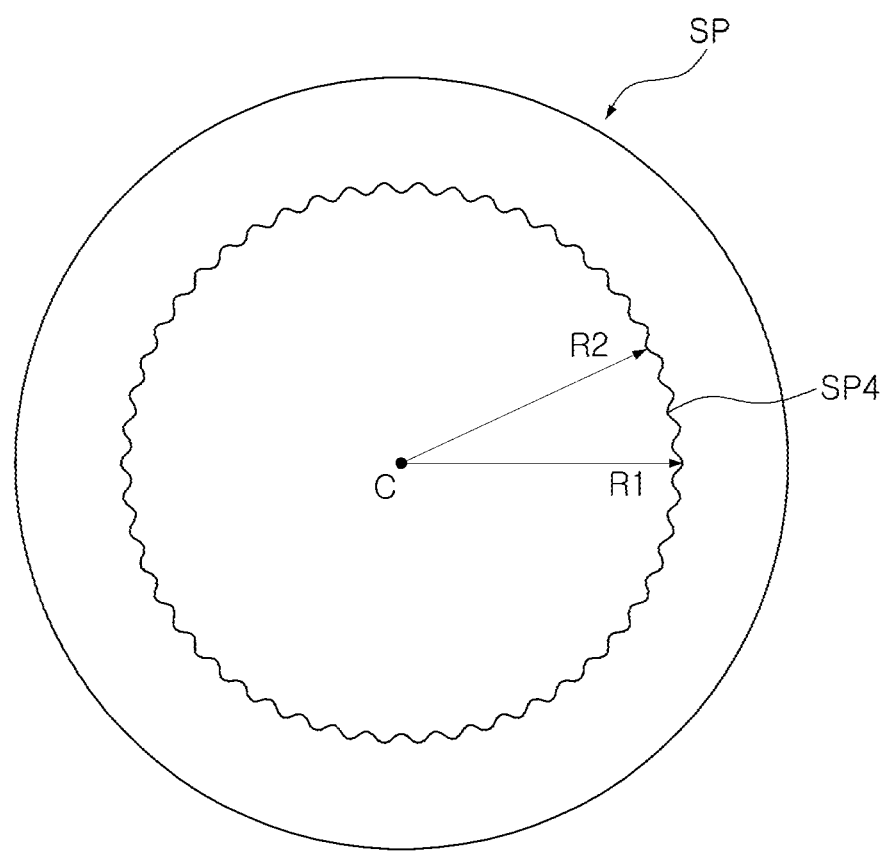
FIGS. 18, 19, 20, and 21 are plan views of gap maintaining members according to various examples.

FIG. 13 illustrates an optical imaging system 400 according to a comparative example. In FIG. 13, reference numeral 410 denotes a first lens, reference numeral 420 denotes a second lens, reference numeral 430 denotes a third lens, reference numeral 440 denotes a fourth lens, reference numeral 450 denotes a fifth lens, and reference numeral 460 denotes a sixth lens, reference numeral 470 denotes a filter, and reference numeral 480 denotes an imaging plane of an image sensor. FIGS. 14 to 16 illustrate aberration curves related to the optical imaging system 400.

An optical imaging system according to the present disclosure, including the first to third examples, includes a gap maintaining member for reducing flare. A gap maintaining member according to an example will be described with reference to FIGS. 17 and 18.

A gap maintaining member SP is configured to maintain a distance between two adjacent lenses. For example, the gap maintaining member SP is disposed between a first lens and a second lens to maintain a constant distance from an image-side surface of the first lens to an object-side surface of the second lens. However, the disposition location of the gap maintaining member SP is not limited to a location between the first lens and the second lens. For example, the gap maintaining member SP may be disposed between the second lens and the third lens or between the third lens and the fourth lens. The gap maintaining member SP may be disposed between lenses having different refractive powers. For example, the gap maintaining member SP may be disposed between a lens having positive refractive power and a lens having negative refractive power, or may be disposed between a lens having negative refractive power and a lens having positive refractive power. The gap maintaining member SP may be disposed between lenses having opposing surfaces of different shapes. As an example, the gap maintaining member SP may be disposed between a lens having a convex image-side surface and a lens having a concave object-side surface. As another example, the gap maintaining member SP may be disposed between a lens having a concave image-side surface and a lens having a convex object-side surface.

An internal circumferential surface of the gap maintaining member SP may have a shape having a first radius R1 around an optical axis C. The gap maintaining member SP may be configured to reduce flare caused by scattered light of a lens. For example, projections SP2 and SP4 may be formed on the internal circumferential surface of the gap maintaining member SP. Each of the projections SP2 and SP4 may have a sawtooth shape illustrated in FIG. 17 or a wave shape illustrated in FIG. 18. The projections SP2 and SP4 may be formed in a circumferential direction around the optical axis C. A distance from the optical axis C to a maximum apex of each of the projections SP2 and SP4 (a second radius R2) may be smaller than a first radius R1. The projections SP2 and SP4 may be densely formed on the internal circumferential surface of the gap maintaining member SP. For example, the number of projections SP2 and SP4, formed on the internal circumferential surface of the gap maintaining member SP, may be 50 or more to less than 200. The internal circumferential surface of the gap maintaining member SP may have a certain size. For example, at least one of the first radius R1 and the second radius R2 of the gap maintaining member SP may be smaller than an effective radius of the first lens or an effective radius of the second lens.

The above-configured gap maintaining member SP may block incidence of scattered light, generated between two lenses, to reduce flare.

Figure 19:
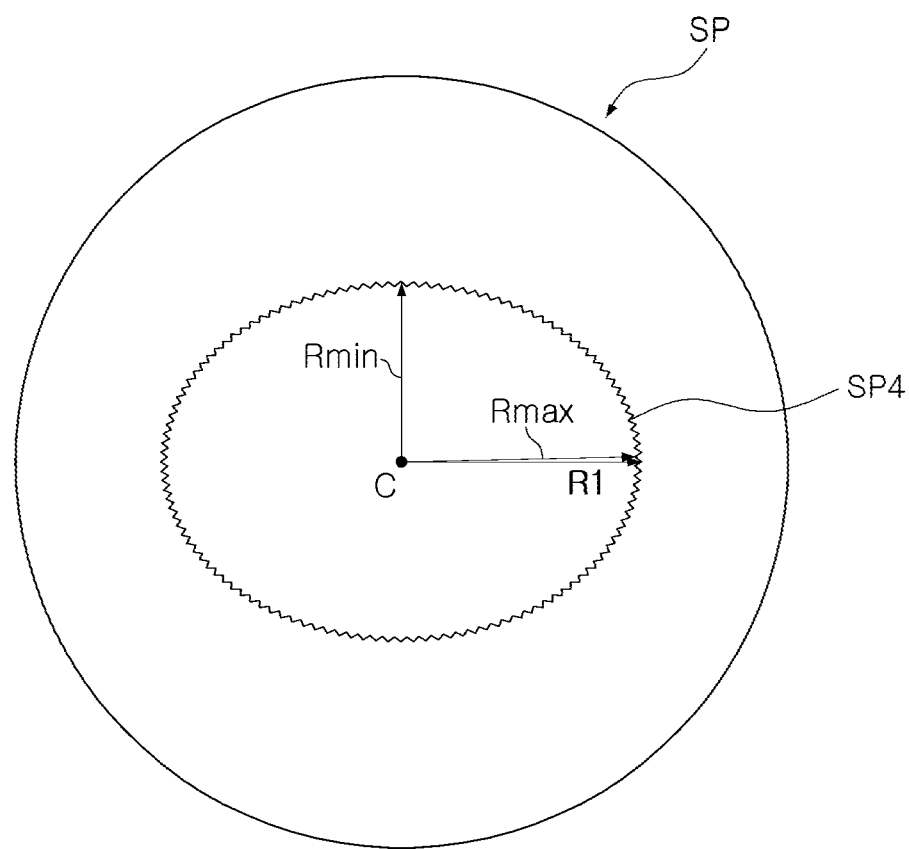
Figure 20:
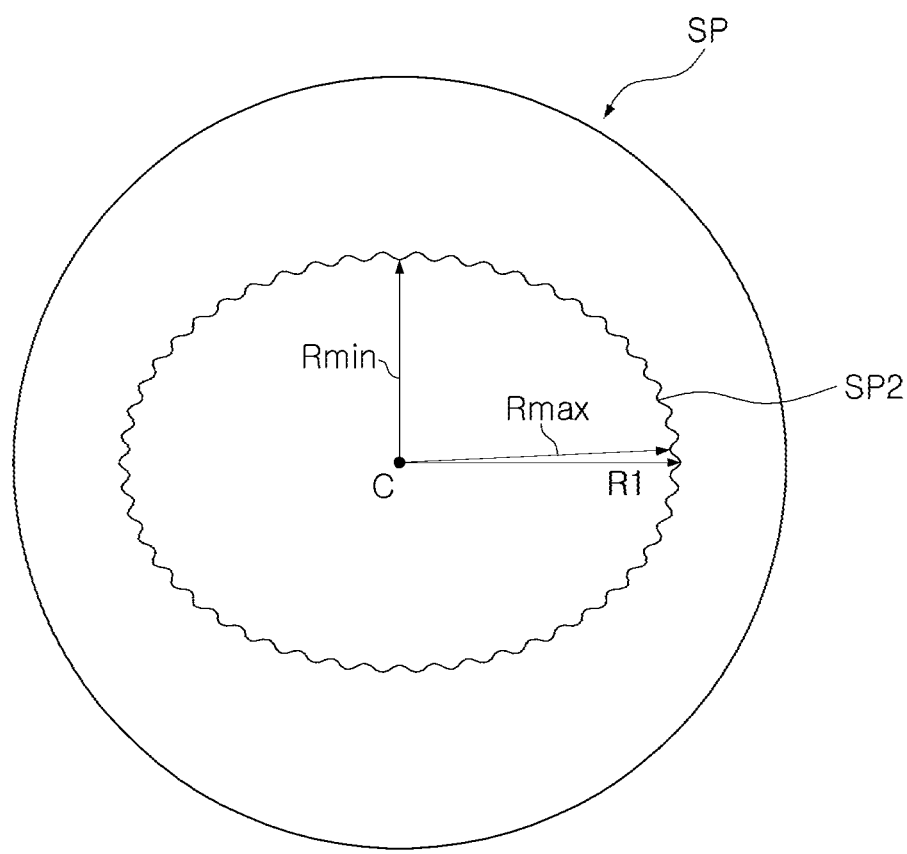

Hereinafter, a gap maintaining member according to another example will be described with reference to FIGS. 19 to 21.

The gap maintaining member SP is configured to maintain a distance between two adjacent lenses. For example, the gap maintaining member SP is disposed between the first lens and the second lens to maintain a constant distance from an image-side surface of the first lens to an object-side surface of the second lens. However, a disposition location of the gap maintaining member SP is not limited to a location between the first lens and the second lens. For example, the gap maintaining member SP may be disposed between the second lens and the third lens or between the third lens and the fourth lens. The gap maintaining member SP may be disposed between the lenses having different refractive powers. For example, the gap maintaining member SP may be disposed between a lens having positive refractive power and a lens having negative refractive power, or may be disposed between a lens having negative refractive power and a lens having positive refractive power. The gap maintaining member SP may be disposed between lenses having opposing surface of different shapes. As an example, the gap maintaining member SP may be disposed between a lens having a convex image-side surface and a lens having a concave object-side surface. As another example, the gap maintaining member SP may be disposed between a lens having a concave image-side surface and a lens having a convex object-side surface.

An internal circumferential surface of the gap maintaining member SP may have an elliptical shape having a major axis and a minor axis around an optical axis C. The gap maintaining member SP may be configured to reduce flare caused by scattered light of a lens. For example, projections SP2 and SP4 may be formed on the internal circumferential surface of the gap maintaining member SP. Each of the projections SP2 and SP4 may have a sawtooth shape illustrated in FIG. 19 or a wave shape illustrated in FIG. 20. The projections SP2 and SP4 may be formed at gaps along the internal circumferential surface around the optical axis C. The projections SP2 and SP4 may include a plurality of projections. For example, the number of projections SP2 and SP4, formed on the internal circumferential surface of the gap maintaining member SP, may be 50 or more to less than 200. The internal circumferential surface of the gap maintaining member SP may have a certain size. For example, a distance Rmax from the optical axis C to an apex of each of the projections SP2 and SP4, disposed at a maximum distance in the direction intersecting the optical axis C, may be smaller than an effective radius of an adjacent lens. In addition, Rmax may be smaller than an effective radius of an image-side surface of the lens disposed on an object side of the gap maintaining member SP. For reference, in FIGS. 19 and 20, Rmin is a distance from an optical axis to an apex of each of the projections SP2 and SP4 disposed at the shortest distance.

The above-configured gap-maintaining member SP may block incidence of scattered light, generated between lenses, to reduce flare.

Figure 21:
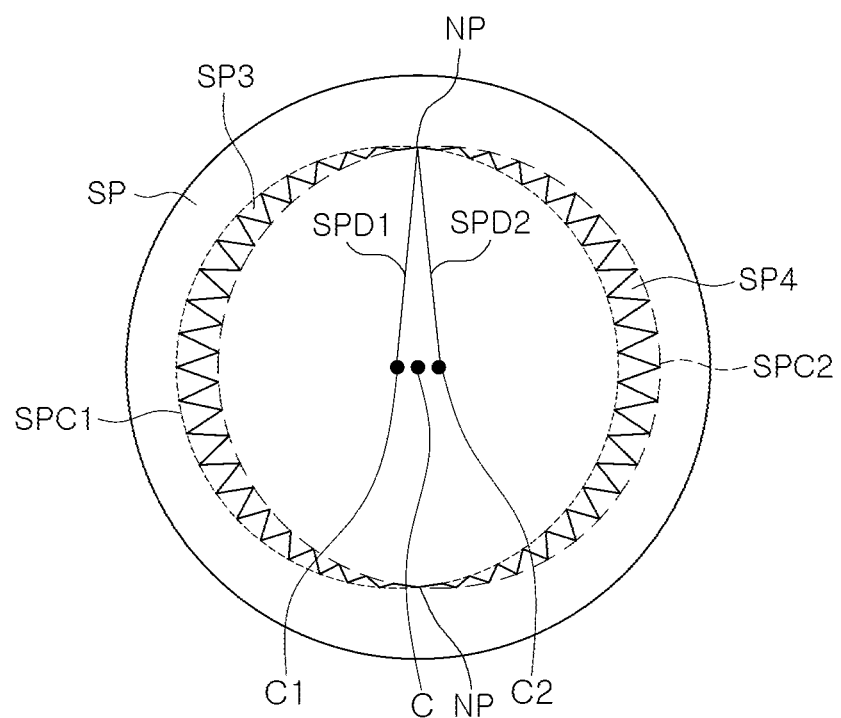

The gap maintaining member SP may be manufactured in the form illustrated in FIG. 21. For example, an internal circumferential surface of the gap maintaining member SP may include a first internal circumferential surface SPC1, forming a circular arc around C1, and a second internal circumferential surface SPC2 forming a circular arc around C2. An arc, forming the first internal circumferential surface SPC1, and an arc, forming the second internal circumferential surface SPC2, may intersect at two intersection points NP. Radii of the arcs, forming the first internal circumferential surface SPC1 and the second internal circumferential surface SPC2, may be substantially the same. For example, a distance SPD1 from C1 to the intersection point NP may be the same as a distance SPD2 from C2 to the intersection point NP.

Projections SP3 and SP4 may be formed on the first internal circumferential surface SPC1 and the second internal circumferential surface SPC2, respectively. For example, the first projection SP3 may be formed on the first internal circumferential surface SPC1, and the second projection SP4 may be formed on the second internal circumferential surface SPC2. Sizes of the projections SP3 and SP4 may be increased in a direction away from the intersection point NP. For example, the projections SP3 and SP4, each having a maximum size, may be formed in a point farthest from the intersection point NP.

Curves, connecting end portions of the projections SP3 and SP4, may be arc-shaped overall. For example, the curve connecting the end portions of the first projection SP3 may be symmetrical with respect to the arc forming the second internal circumferential surface SPC2 based on a line segment connecting the intersection points NP, and the curve connecting the end portions of the second projection SP4 may be symmetrical with respect to the arc forming the first internal circumferential surface SPC1 based on the line segment connecting the intersection point NP.

As described above, curvature of an imaging plane, which may occur when a short-range object is imaged, may be reduced.

In addition, flare caused by scattered light generated during a light incidence process may be reduced.

While this disclosure includes specific examples, it will be apparent after an understanding of the disclosure of this application that various changes in forms and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical imaging system comprising:
    a first lens having a refractive power;
    a second lens having a refractive power;
    a third lens having a refractive power;
    a stop disposed between the second lens and the third lens;
    a fourth lens having a refractive power;
    a fifth lens having a refractive power; and
    a sixth lens having a refractive power and a focal length within a range of −110 mm to −12 mm,
    wherein the first lens to the sixth lens are the only lenses having a refractive power in the optical imaging system, and are sequentially disposed in ascending numerical order along an optical axis of the optical imaging system from an object side of the optical imaging system toward an imaging plane of the optical imaging system,
    the optical imaging system further comprises a gap maintaining member disposed between one or more pairs of adjacent lenses among the first lens to the fourth lens, and comprising a projection protruding from an internal circumferential surface of the gap maintaining member in a direction intersecting the optical axis,
    $1.003 < \text{LSPi}/R2 < 1.128$, where LSPi is an effective radius of an image-side surface of a lens disposed on an object side of the gap maintaining member, and R2 is a distance from the optical axis to an apex of the projection,
    a refractive index of the second lens is greater than a refractive index of each of the first, third, fourth, fifth, and sixth lenses, and an Abbe number of the second lens is less than 21 and less than an Abbe number of each of the first, third, fourth, fifth, and sixth lenses, and
    a radius of curvature of an object-side surface of the first lens is greater than a radius of curvature of an object-side surface of the third lens.

2. The optical imaging system of claim 1, wherein the projection has a wave shape or a sawtooth shape.

3. The optical imaging system of claim 1, wherein the projection is any one of a plurality of projections numbering 50 or more to less than 200 each protruding from the internal circumferential surface of the gap maintaining member in a direction intersecting the optical axis.

4. The optical imaging system of claim 1, wherein the distance R2 from the optical axis to the projection is smaller than an effective radius of the lens disposed on the object side of the gap maintaining member.

5. The optical imaging system of claim 1, wherein a sign of a refractive power of the lens disposed on the object side of the gap maintaining member is different from a sign of a refractive power of a lens disposed on an image side of the gap maintaining member.

6. The optical imaging system of claim 1, wherein a shape of the image-side surface of the lens disposed on the object side of the gap maintaining member is different from a shape of an object-side surface of a lens disposed on an image side of the gap maintaining member.

7. The optical imaging system of claim 1, wherein $0.1 < CT3/TTL$, where CT3 is a thickness of the third lens along the optical axis, and TTL is a distance along the optical axis from the object-side surface of the first lens to the imaging plane.

8. The optical imaging system of claim 1, wherein $f3/f < 2.0$, where f is a focal length of the optical imaging system, and f3 is a focal length of the third lens.

9. The optical imaging system of claim 1, wherein $0.005 \text{ mm} < \text{LSPi} - R2 < 0.100 \text{ mm}$.

10. The optical imaging system of claim 1, wherein an f number of the optical imaging system is less than 2.0.

11. An optical imaging system comprising:
    a first lens having a positive refractive power;
    a second lens having a negative refractive power;
    a third lens having a positive refractive power;
    a stop disposed between the second lens and the third lens;
    a fourth lens having a negative refractive power;
    a fifth lens having a positive refractive power; and
    a sixth lens having a negative refractive power and a focal length within a range of −110 mm to −12 mm,
    wherein the first lens to the sixth lens are the only lenses having a refractive power in the optical imaging system, and are sequentially disposed in ascending numerical order along an optical axis of the optical imaging system from an object side of the optical imaging system toward an imaging plane of the optical imaging system,
    the optical imaging system further comprises a gap maintaining member disposed between one or more pairs of adjacent lenses among the first lens to the fourth lens, and comprising a projection protruding from an elliptical internal circumferential surface of the gap maintaining member in a direction intersecting the optical axis,
    $0.005 \text{ mm} < \text{LSPi} - R2 < 0.100 \text{ mm}$, where LSPi is an effective radius of an image-side surface of a lens disposed on an object side of the gap maintaining member, and R2 is a distance from the optical axis to an apex of the projection,
    a refractive index of the second lens is greater than a refractive index of each of the first, third, fourth, fifth, and sixth lenses, and an Abbe number of the second lens is less than 21 and less than an Abbe number of each of the first, third, fourth, fifth, and sixth lenses, and
    a radius of curvature of an object-side surface of the first lens is greater than a radius of curvature of an object-side surface of the third lens.

12. The optical imaging system of claim 11, wherein $1.003 < \text{LSPi}/R2 < 1.128$.

13. The optical imaging system of claim 11, wherein the projection is disposed on a major-axis diameter of the elliptical internal surface of the gap maintaining member, and a distance Rmax from the optical axis to the apex of the projection along the major-axis diameter of the elliptical internal surface of the gap maintaining member is smaller than an effective radius of the image-side surface of the lens disposed on the object side of the gap maintaining member.

14. The optical imaging system of claim 11, wherein a major-axis direction of the elliptical internal circumferential surface of the gap maintaining member is parallel to a length direction of a major axis of the imaging plane.

15. The optical imaging system of claim 11, wherein the projection is disposed on a major-axis diameter of the elliptical internal surface of the gap maintaining member, and 0.005 mm<LSPi−Rmax<0.100 mm, where Rmax is a distance from the optical axis to the apex of the projection along the major-axis diameter of the elliptical internal surface of the gap maintaining member.

16. The optical imaging system of claim 11, wherein the projection is disposed on a major-axis diameter of the elliptical internal surface of the gap maintaining member, and 1.003<LSPi/Rmax<1.128, where Rmax is a distance from the optical axis to the apex of the projection along the major-axis diameter of the elliptical internal surface of the gap maintaining member.

17. The optical imaging system of claim 11, wherein the projection is any one of a plurality of projections numbering 50 or more to less than 200 each protruding from the elliptical internal circumferential surface of the gap maintaining member in a direction intersecting the optical axis.

18. The optical imaging system of claim 11, wherein the gap maintaining member is disposed between the first lens and the second lens.

19. The optical imaging system of claim 11, wherein an f number of the optical imaging system is less than 2.0.

20. An optical imaging system comprising:
a first lens having a refractive power;
a second lens having a refractive power;
a third lens having a refractive power;
a stop disposed between the second lens and the third lens;
a fourth lens having a refractive power;
a fifth lens having a refractive power; and
a sixth lens having a refractive power,
wherein the first lens to the sixth lens are sequentially disposed in ascending numerical order along an optical axis of the optical imaging system from an object side of the optical imaging system toward an imaging plane of the optical imaging system;
the optical imaging system further comprises a gap maintaining member disposed between one or more pairs of adjacent lenses among the first lens to the fourth lens, and comprising a projection protruding from an internal circumferential surface of the gap maintaining member in a direction intersecting the optical axis,
a focal length of the optical imaging system is within a range of 3.8 to 4.2 mm,
an f number of the optical imaging system is less than 2.0,
−1.003<LSPi/R2<1.128, where LSPi is an effective radius of an image-side surface of a lens disposed on an object side of the gap maintaining member, and R2 is a distance from the optical axis to an apex of the projection,
a refractive index of the second lens is greater than a refractive index of each of the first, third, fourth, fifth, and sixth lenses, and an Abbe number of the second lens is less than 21 and less than an Abbe number of each of the first, third, fourth, fifth, and sixth lenses, and
a radius of curvature of an object-side surface of the first lens is greater than a radius of curvature of an object-side surface of the third lens.

* * * * *